United States Patent
Asba et al.

(10) Patent No.: US 10,911,320 B2
(45) Date of Patent: Feb. 2, 2021

(54) GUIDED INTERFACE FOR CONFIGURING KEY PERFORMANCE INDICATORS

(71) Applicant: ServiceNow, Inc., Santa Clara, CA (US)

(72) Inventors: Nabil Abu Asba, The Hague (NL); Ying Li, Paris (FR)

(73) Assignee: ServiceNow, Inc., Santa Clara, CA (US)

( * ) Notice: Subject to any disclaimer, the term of this patent is extended or adjusted under 35 U.S.C. 154(b) by 84 days.

(21) Appl. No.: 16/255,671

(22) Filed: Jan. 23, 2019

(65) Prior Publication Data

US 2020/0236006 A1 Jul. 23, 2020

(51) Int. Cl.
*H04L 12/24* (2006.01)

(52) U.S. Cl.
CPC .............. *H04L 41/20* (2013.01); *H04L 41/22* (2013.01)

(58) Field of Classification Search
CPC ......... H04L 41/20; H04L 41/22; H04L 41/12; H04L 12/24; H04L 67/1095; G06F 9/451; G06F 8/61; G06F 17/30864
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,816,898 B1 | 11/2004 | Scarpelli |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |

(Continued)

*Primary Examiner* — Clayton R Williams
*Assistant Examiner* — Christopher B Robinson
(74) *Attorney, Agent, or Firm* — Fletcher Yoder PC

(57) ABSTRACT

A system and method is disclosed for configuring a performance analytics (PA) software application operational for analysis of performance data of a managed network. The system may include a PA database containing data for generating a unified graphical user interface (GUI) for consolidating configuration of key performance indicators (KPIs) of the managed network, and one or more server devices configured to receive, from a client device, a request to view information representative of a particular KPI. Based on the request, the server devices may obtain information regarding the particular KPI from the PA database and then transmit, to the client device, a representation of the unified GUI. The unified GUI may include a tabbed interface containing views corresponding to groups of related attributes of the particular KPI, the views including: (i) a data source view, (ii) a breakdown view, (iii) a data collection view, and (iv) an impact analysis view.

20 Claims, 16 Drawing Sheets

(56) References Cited

U.S. PATENT DOCUMENTS

| | | | | | |
|---|---|---|---|---|---|
| 7,945,860 B2 | 5/2011 | Vambenepe | | | |
| 7,966,398 B2 | 6/2011 | Wiles | | | |
| 8,051,164 B2 | 11/2011 | Peuter | | | |
| 8,151,261 B2 | 4/2012 | Sirota | | | |
| 8,224,683 B2 | 7/2012 | Manos | | | |
| 8,266,096 B2 | 9/2012 | Navarrete | | | |
| 8,402,127 B2 | 3/2013 | Solin | | | |
| 8,457,928 B2 | 6/2013 | Dang | | | |
| 8,478,569 B2 | 7/2013 | Scarpelli | | | |
| 8,612,408 B2 | 12/2013 | Trinon | | | |
| 8,646,093 B2 | 2/2014 | Myers | | | |
| 8,674,992 B2 | 3/2014 | Poston | | | |
| 8,689,241 B2 | 4/2014 | Naik | | | |
| 8,743,121 B2 | 6/2014 | De Peuter | | | |
| 8,832,652 B2 | 9/2014 | Mueller | | | |
| 8,887,133 B2 | 11/2014 | Behnia | | | |
| 9,065,783 B2 | 6/2015 | Ding | | | |
| 9,098,322 B2 | 8/2015 | Apte | | | |
| 9,122,552 B2 | 9/2015 | Whitney | | | |
| 9,239,857 B2 | 1/2016 | Trinon | | | |
| 9,317,327 B2 | 4/2016 | Apte | | | |
| 9,363,252 B2 | 6/2016 | Mueller | | | |
| 9,535,737 B2 | 1/2017 | Joy | | | |
| 9,645,833 B2 | 5/2017 | Mueller | | | |
| 9,654,473 B2 | 5/2017 | Miller | | | |
| 9,766,935 B2 | 9/2017 | Kelkar | | | |
| 9,792,387 B2 | 10/2017 | George | | | |
| 9,805,322 B2 | 10/2017 | Kelkar | | | |
| 9,819,629 B2 | 11/2017 | Moon | | | |
| 10,628,603 B1* | 4/2020 | de Boer | | | G06F 21/6227 |
| 2009/0281845 A1* | 11/2009 | Fukuda | | | G06Q 10/10 |
| | | | | | 705/7.39 |
| 2009/0313279 A1* | 12/2009 | Tomaszewski | | | G06F 16/2453 |
| 2013/0258865 A1* | 10/2013 | Kovvali | | | H04W 24/10 |
| | | | | | 370/241 |
| 2016/0105335 A1* | 4/2016 | Choudhary | | | H04L 69/329 |
| | | | | | 709/224 |
| 2016/0366036 A1* | 12/2016 | Gupta | | | H04L 67/16 |
| 2020/0133814 A1* | 4/2020 | Prabath | | | G06F 16/2228 |

\* cited by examiner

Number of incidents closed by self-service

Indicator

View Scorecard | Add to Dashboard

Data Source | Breakdowns | Data Collection | Impact Analysis

Schedule job
Select an existing job using edit or create a new job to collect scores for the indicator.

| ☰ Jobs | Edit... | | 900 | | | | |

Indicator = Number of incidents closed by self-service

| | ☰ Jobs | | ☰ Active | ☰ Collect | ✦ ▼▼▼▲▲▲ | 1 to 2 of 2 | ⊞ |
| ☐ | ⓘ [PA Incident] Historic Data Collection | | true | All breakdowns | | | |
| ☐ | ⓘ [PA Incident] Daily Data Collection | | true | All breakdowns | ☰ Collect indicator | | |
| | | | | true | ▼▼▼▲▲▲ | 1 to 2 of 2 | |
| | | | | true | | | |

Actions on selected rows... ⊗
~ 902

Create new job

Collect scores now  904
Create a single use job to immediately collect scores for just this indicator.

Relative start [      ] days ago

Relative end  [      ] days ago

Interval      [ 1    ] [ Day ▼ ]

Execute Now

GUIDED INTERFACE FOR CONFIGURING KEY PERFORMANCE INDICATORS

BACKGROUND

Managed networks may include various types of computer networks that can be remotely administered. This management may involve one or more computing devices disposed with a remote network management platform collecting information about the configuration and operational states of software applications executing on behalf on the managed network, and then presenting representations of this information by way of one or more user interfaces. The user interfaces may be, for instance, web-based user interfaces. In some instances, remote management of networks may be provided by a third party, such as a service provider or vendor.

Some of the collected information may relate to key performance indicators (KPIs). KPIs include any sort of measurement, reading, or data that is relevant to the managed network. Thus, KPIs may reflect performance of computing devices on the network itself (e.g., memory utilization, processor utilization, transactions per second) or performance of higher-level applications executing on the remote network management platform (e.g., a number of times per day that users on the managed network have requested a particular type of technical assistance). Among other capabilities, the user interfaces may be able to display KPIs in numerous visualizations, such as charts, graphs, or tables.

Monitoring, analysis, and visualization of KPIs may be implemented as a specific facility or environment within an overall remote network management system, and may involve databases and servers in or associated with a managed network as well as end-user devices, such as client devices with graphical user interfaces (GUIs). Visualization and analysis tools may include various software components, which may be updated and/or revised from time to time. Therefore, in addition to functional capabilities used in practice, stability and integrity of visualization and analysis tools during and after updates and/or revisions may also be of interest.

SUMMARY

A performance monitoring and analysis system may implement monitoring, analysis, and visualization of KPIs within an overall remote network management system as a Performance Analytics (PA) application program with extendable features and capabilities. In accordance with example embodiments, a PA application program may include program components configured to operate on one or more servers and databases in a remote network management system, as well as client-based program components, such as web applications with graphical features and functions, configured to operate on client devices having graphical user interfaces (GUIs). Server and database programs may collect, record, and manage data related to and/or indicative of performance from a managed network, while client applications may provide end users with tools to define KPIs and configure and control monitoring of KPIs, as well as to retrieve KPI data from databases or servers for visualization, analysis, and evaluation of KPIs. A PA system may therefore include a PA application program, as well as supporting hardware components and systems, such as servers, databases, computing devices, and client devices.

More particularly, data related to and/or indicative of performance may include data directly related to performance, such as incident or problem reports logged by end users or IT personnel, for example. Other forms of direct performance data may include monitored or measured resource utilization (e.g., memory, CPU, and network bandwidth). Performance data may also include data related to the mission of an organization, such as sales or financial results. In addition, performance data may include indirect or derived forms of performance metrics that may involve relationships between two or more forms of recorded or monitored data. All or some of the various types and forms of performance data may be stored in one or more network databases, and be available within the PA context for analysis, viewing, and evaluation via direct transactions with the databases, or via intermediary server applications, for example.

Defining or creating KPIs may entail identifying directly available or derivable variables that may be indicative of behavior or performance when monitored in time. Configuration and control may entail setting parameters that determine monitoring frequency and duration, as well as various filters applied during collection and/or derivation of KPI data. KPIs may thus be considered descriptions of data that form the basis of the indicators, as well as parameters and filters. The actual performance analysis or assessment for a given KPI then utilizes actual data specified and collected according to the given KPI.

In a large managed network, the breadth and depth of data that may be utilized by a PA system can be quite large. Correspondingly, the number and variety types of possible interrelationships between monitored or logged data that may form the basis of KPIs can also be large. In addition, the interrelationships and dependencies of functional components of a PA system can be large and complex. These factors present challenges to designing and implementing a PA system that provides versatility and flexibility to end users without imposing the underlying complexities on end users when they invoke operations that rely on or need to account for those complexities. It would therefore be desirable to devise and implement user interfaces that provide streamlined and efficient graphical tools for carrying out PA tasks involving complex relationships among and between performance data, and between program components of the PA system.

Accordingly, a first example embodiment may involve a system for configuring a performance analytics (PA) software application, wherein the system is disposed within a computational instance of a remote network management platform that is associated with a managed network, and the PA software application is configured for processing and analysis of performance data of the managed network, the system comprising: a PA database containing data for generating a unified graphical user interface (GUI) for consolidating configuration of key performance indicators (KPIs) of the managed network; one or more server devices disposed within the remote network management platform, wherein the one or more server devices are configured to: receive, from a client device, a request to view information representative of a particular KPI; based on the request, obtain information regarding the particular KPI from the PA database; and transmit, to the client device, a representation of the unified GUI, wherein the unified GUI includes a tabbed interface, wherein the tabbed interface contains views corresponding to groups of related attributes of the particular KPI, the views including: (i) a data source view arranged for interactive configuration a data source from the PA database for the particular KPI, (ii) a breakdown view arranged for interactive configuration of a breakdown for the particular KPI, wherein the breakdown comprises a breakdown data filter, (iii) a data collection view for interactive configuration of at least one data collection job from the data source, wherein the data collection job comprises a time period and frequency for updating the particular KPI with the data source, and (iv) an impact analysis view arranged to display one or more components of the PA application program that has a dependency relation with the particular KPI.

In a second example embodiment may involve a method for configuring a performance analytics (PA) software application configured for execution on a computing device disposed within a computational instance of a remote network management platform that is associated with a managed network, wherein the PA software application is configured for processing and analysis of performance data of the managed network, wherein the remote network management platform comprises a PA database containing data for generating a unified graphical user interface (GUI) for consolidating configuration of key performance indicators (KPIs) of the managed network, and wherein the method comprises: receiving, from a client device, a request to view information representative of a particular KPI; based on the request, obtaining information regarding the particular KPI from the PA database; and transmitting, to the client device, a representation of the unified GUI, wherein the unified GUI includes a tabbed interface, wherein the tabbed interface contains views corresponding to groups of related attributes of the particular KPI, the views including: (i) a data source view arranged for interactive configuration a data source from the PA database for the particular KPI, (ii) a breakdown view arranged for interactive configuration of a breakdown for the particular KPI, wherein the breakdown comprises a breakdown data filter, (iii) a data collection view for interactive configuration of at least one data collection job from the data source, wherein the data collection job comprises a time period and frequency for updating the particular KPI with the data source, and (iv) an impact analysis view arranged to display one or more components of the PA application program that has a dependency relation with the particular KPI.

In a third example embodiment may involve a non-transitory computer readable medium having instructions stored thereon for configuring a performance analytics (PA) software application, wherein the PA software application is configured for execution on a computing device disposed within a computational instance of a remote network management platform that is associated with a managed network, and the PA software application is configured for processing and analysis of performance data of the managed network, wherein the remote network management platform comprises a PA database containing data for generating a unified graphical user interface (GUI) for consolidating configuration of key performance indicators (KPIs) of the managed network, and wherein the instructions, when executed by one or more processors, cause the one or more processors to carry out operations including: receiving, from a client device, a request to view information representative of a particular KPI; based on the request, obtaining information regarding the particular KPI from the PA database; and transmitting, to the client device, a representation of the unified GUI, wherein the unified GUI includes a tabbed interface, wherein the tabbed interface contains views corresponding to groups of related attributes of the particular KPI, the views including: (i) a data source view arranged for interactive configuration a data source from the PA database for the particular KPI, (ii) a breakdown view arranged for interactive configuration of a breakdown for the particular KPI, wherein the breakdown comprises a breakdown data filter, (iii) a data collection view for interactive configuration of at least one data collection job from the data source, wherein the data collection job comprises a time period and frequency for updating the particular KPI with the data source, and (iv) an impact analysis view arranged to display one or more components of the PA application program that has a dependency relation with the particular KPI.

In a fourth example embodiment, a system may include various means for carrying out each of the operations of the third example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts an example tab view of a unified graphical user interface, in accordance with example embodiments.

FIG. 8C depicts another example option on an example tab view of unified graphical user interface, in accordance with example embodiments.

FIG. 9 depicts still another example tab view of unified graphical user interface, in accordance with example embodiments.

FIG. 11 depicts still another example option on an example tab view of unified graphical user interface, in accordance with example embodiments.

DETAILED DESCRIPTION

Figure 1:
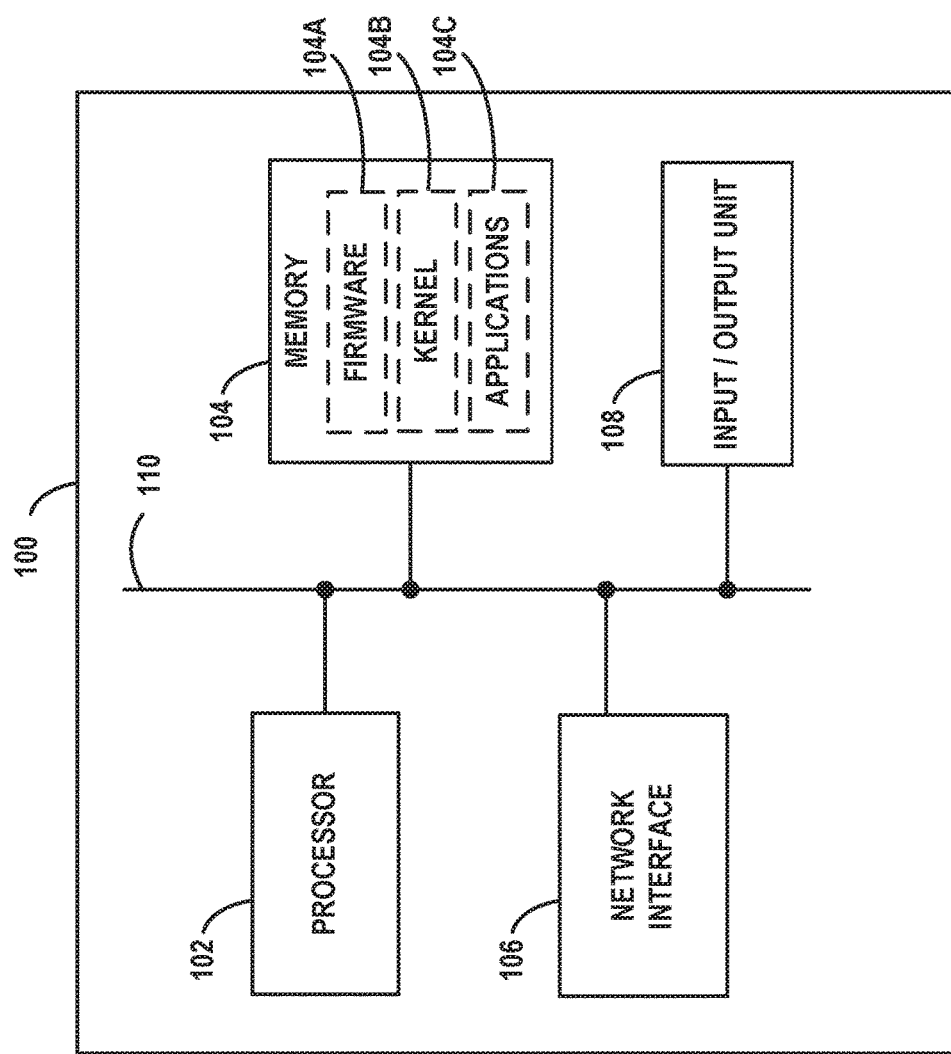
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
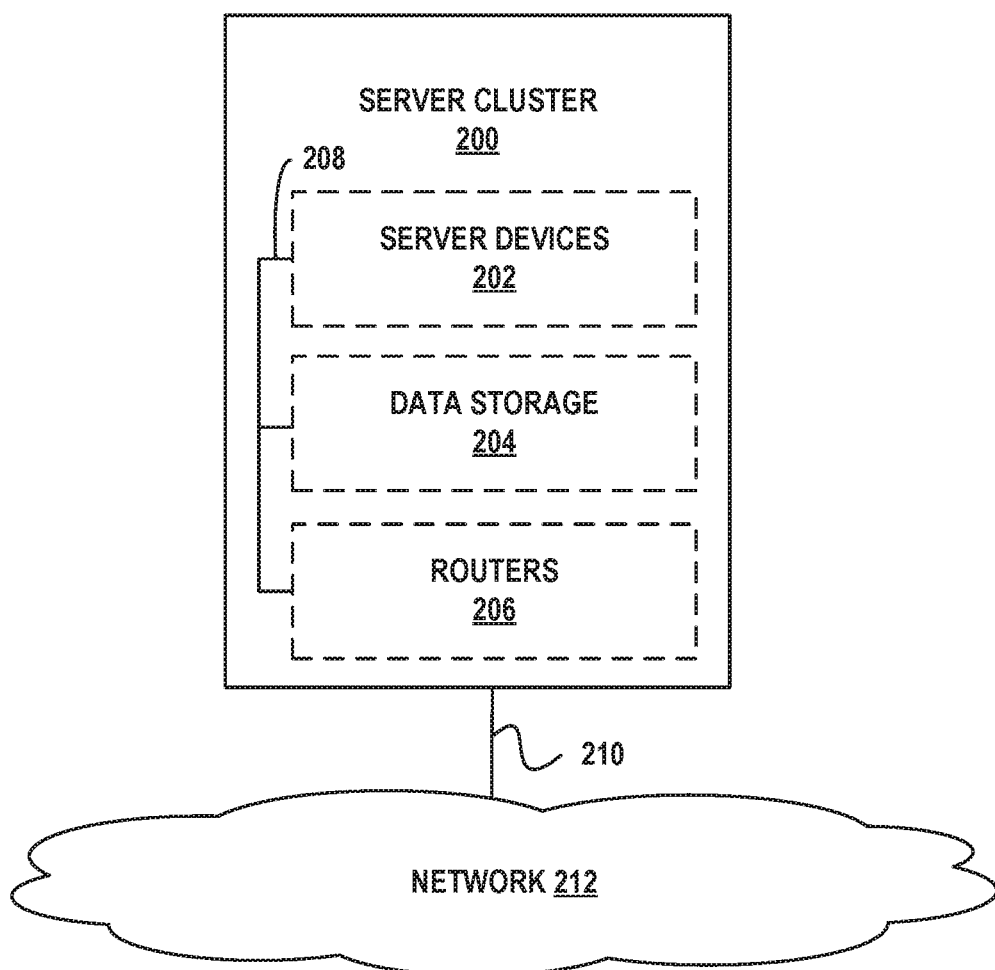
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
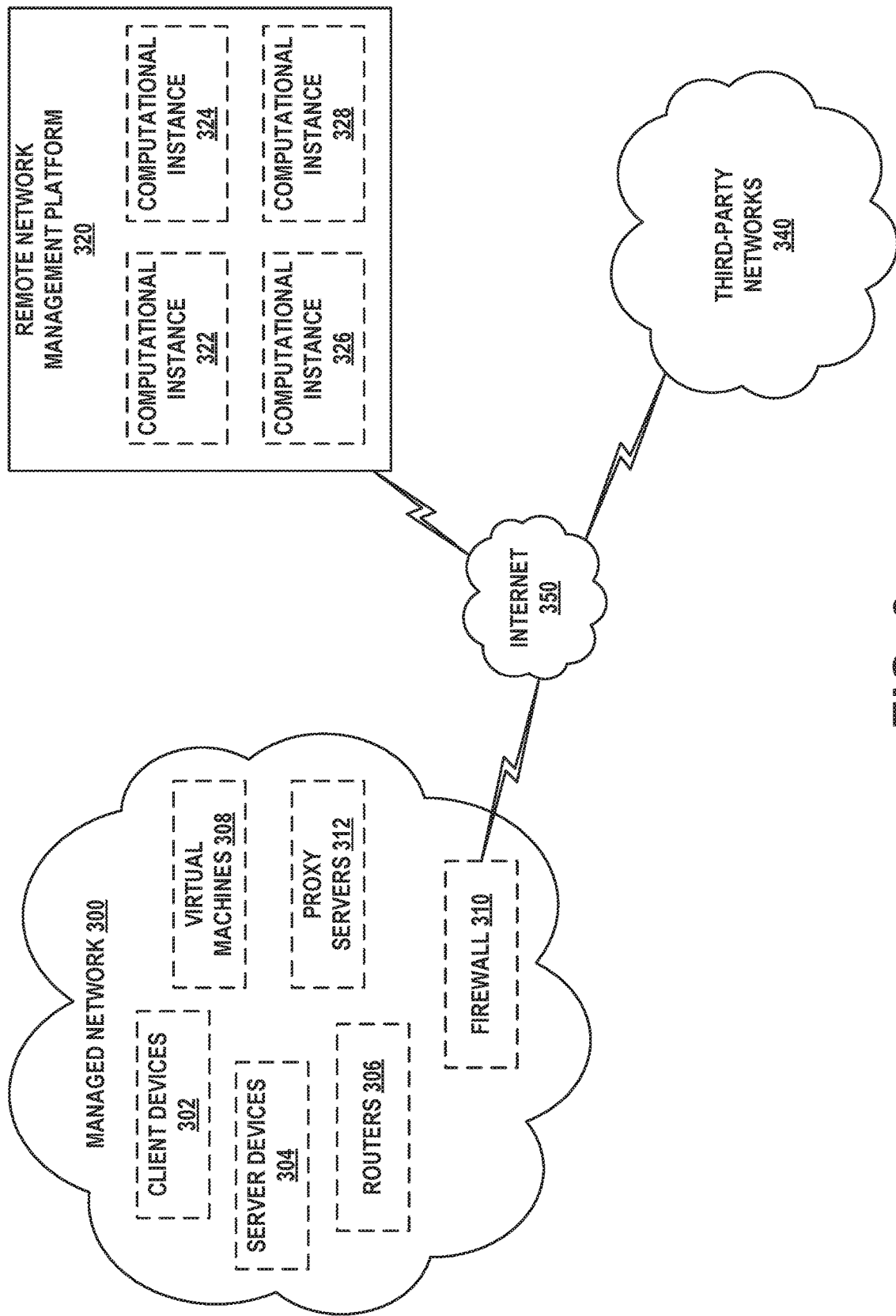
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
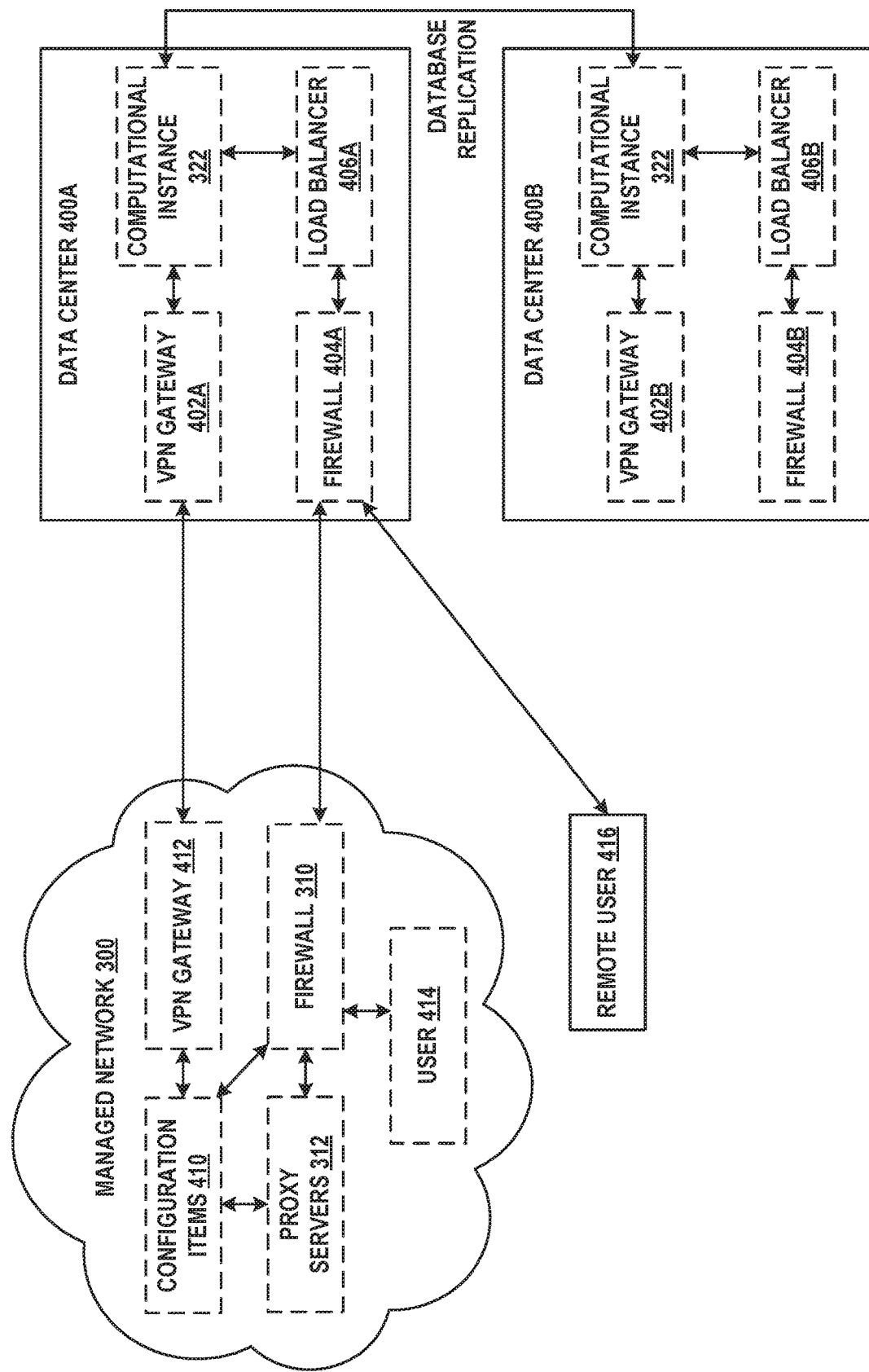
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
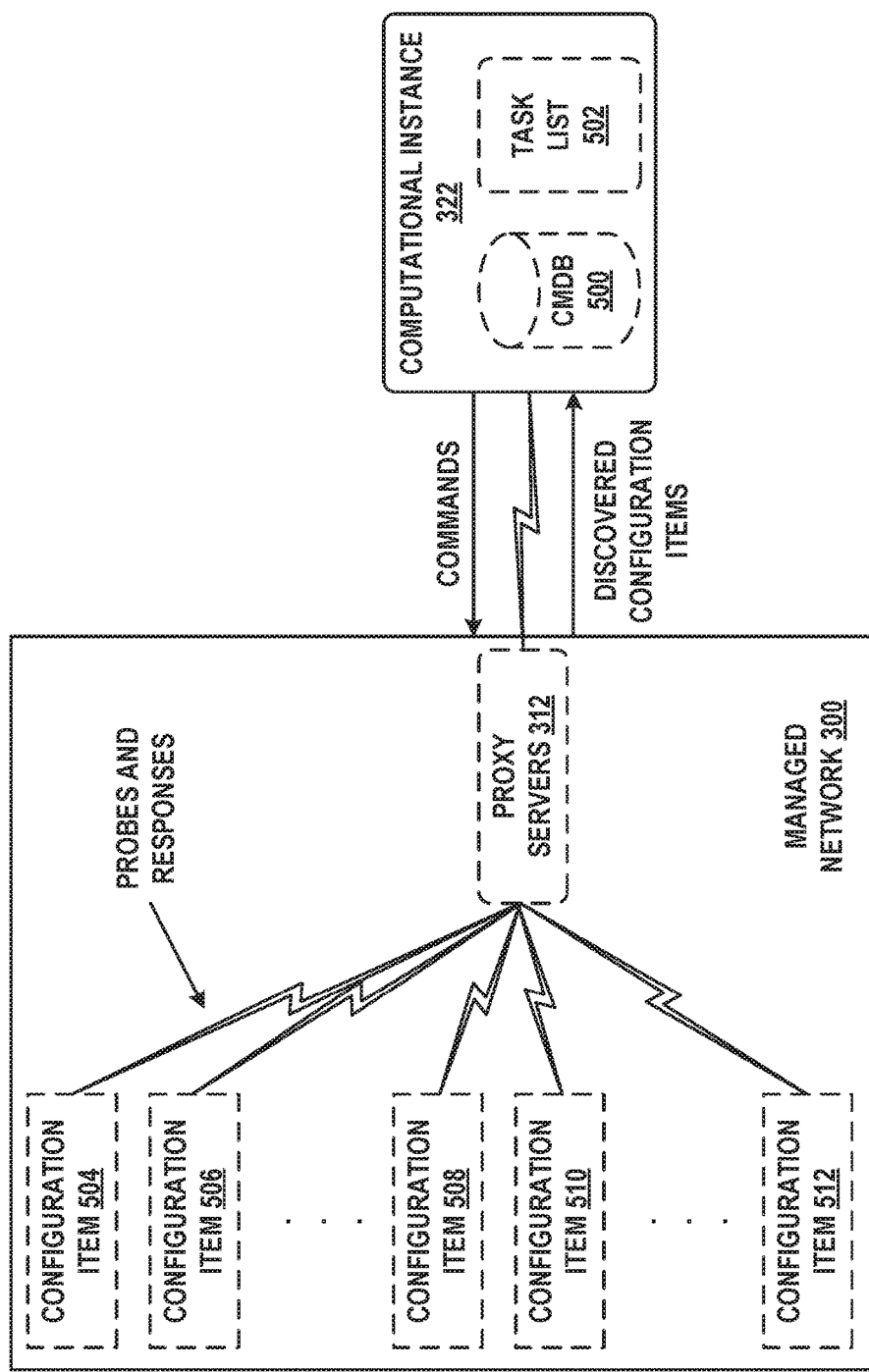
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
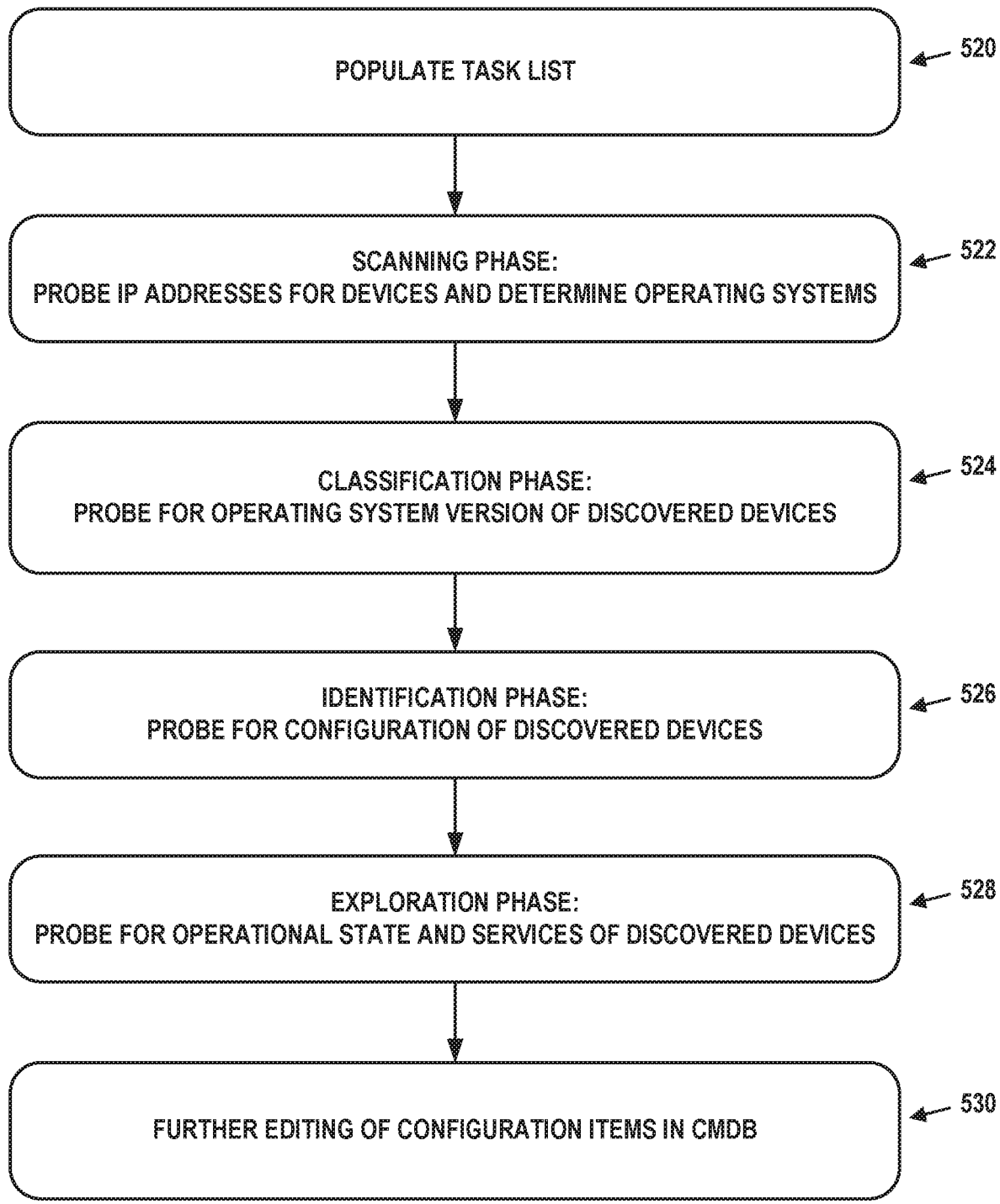
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Performance Analytics Visualizations

As described herein, a visualization may take various forms and be made up of one or more of various "PA elements" or "PA entities." Generally, visualizations typically involve the presentation of KPIs in a graphical format. The term PA entity is used herein to describe both a specific or general graphical function or operation, as well as a PA function, operation, or definition. For example, a widget may describe a graphical component configured for displaying a data plot and providing graphical or textual control elements for allowing a user to adjust appearance, data range, etc., of a KPI display. As another example, a breakdown may be a definable filter that can be applied to measurement data, and may have one or more associated graphical elements for creating and adjusting breakdown parameters (breakdowns are discussed in more detail below). These are just two examples. Other, non-limiting examples of PA entities include dashboards, tabs, scorecards, and databases.

KPIs, which, as noted, may themselves be considered PA entities, may also be referred to as metrics or indicators. In general, KPIs are a type of performance measurement used to evaluate current and past conditions, as well as to forecast trends. KPIs can be used to evaluate the success of a particular activity, such as making progress toward strategic goals or the repeated achievement of some level of operational goal (for example, zero defects, a mean time to resolution of less than 24 hours for certain types of IT issues, or less than 70% processor utilization on a particular server device). KPIs can also be used to measure and/or track an organization's mission. In this context, KPI could be associated with sales, inventory, or other mission-related performance measures.

The act of measuring a KPI may be referred to as collection. KPIs are associated with one or more KPI sources that define one or more fields in a database table (sometimes called a facts table) that are to be collected in order to provide the KPI data. KPI sources may also specify filters to include only a subset of the information in a field. KPI data—e.g., measured or collected data—may be stored, possibly with other KPI-related and PA-related data, in the database. The database for these data is referred to herein as a PA database.

Data measurements associated with a KPI are also referred to herein as "scores." With this terminology, a KPI—either as a PA operational entity or as a graphical operational entity—may also be considered as a descriptor or specification of an indicator, while the corresponding scores are actual measurements collected as specified by the descriptor. For example, a KPI may be defined or created for tracking processor utilization on a particular server. The KPI may also define time windows for data collection and frequency of measurements during the time windows, as well as possibly other filters that may be applied during data collection. The scores for the KPI may then be the utilization measurements collected during the specified time windows at the specified collection or measurement frequencies. The scores may then be collected in records in the PA database. This is just one non-limiting, and simple, example of KPI scores. Other, more complicated KPI definitions and scores are possible as well. As described below, scores may be collected and displayed in scorecards.

A dashboard is single-screen GUI component that contains one or more tabs that logically group components that generally belong together. In some embodiments, a dashboard may be equivalent to or contained within a GUI window. Tabs may be graphical control elements that allow multiple documents or panels to be contained within a single dashboard. Tabs can be used to switch between such documents or panels. Individual GUI widgets may be present on such tabs. In the context of PA, these widgets may display a KPI as a latest value, a time series, in a chart, in a speedometer, in a dial, in a scorecard, or in a column. Other variations are possible.

Breakdowns are PA entities that allow organization and filtering of KPI data on tabs and dashboards. Thus, breakdowns apply organization and/or filtering to KPI score data—i.e., after KPI data (scores) have already been collected. This may be distinguished from filters and other collection criteria defined as part of a KPI and applied as part of, or during, data collection. In some embodiments, breakdowns may take the form of a drop down GUI widget. Regardless, the KPI data can be divided in various ways based on category. For instance, IT trouble ticket incidents can be divided by priority or by originating department. In some cases, breakdowns can use these multiple ways of dividing data in tandem, such as breaking down IT trouble ticket incidents first by priority, then by originating department.

A scorecard can be a dashboard, tab, or widget that displays data related to a single KPI (e.g., in a time series chart widget) and enables detailed analysis of this data. In some embodiments, each KPI may have an associated scorecard that is automatically created. The data may be viewed by breakdown and/or in aggregate (e.g., counts, sums, and maximums of the values). Scorecards may also provide ways of viewing the database fields on which the KPI values are based.

Any of these elements or entities (dashboards, tabs, widgets, breakdowns, and scorecards) may be considered a visualization, or components thereof, and can be user customized. For instance, a user can rearrange the tabs of a dashboard, add or remove widgets from a tab, and create new breakdowns. The appearance of a dashboard, such as what tabs and/or widgets are included, what formats of visualization are included, data ranges, etc., may be determined by one or more configuration settings. In some example embodiments, configuration settings, or just "configuration" for short, may be defined by various data elements and entities, including data tables, data records, variables, parameters, and the like, which can be stored in memory and used to control the content and appearance of the visual, analytical, and interactive components that make up a dashboard. Setting and adjusting values of the data elements and entities allows the appearance and function the dashboard to be set up, as well as adjusted or tuned.

Figure 6A:
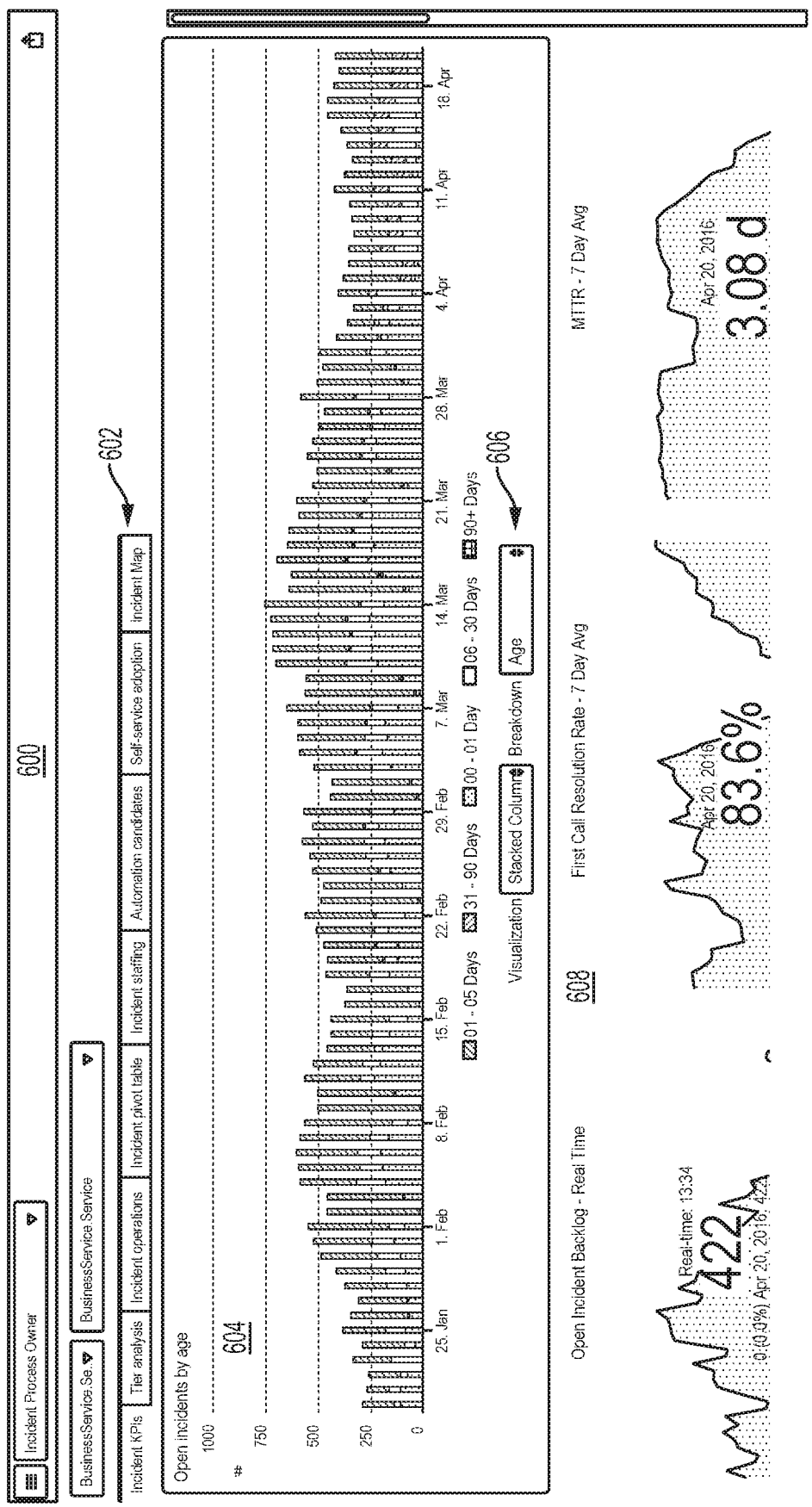
FIG. 6A depicts a performance analytics dashboard in the form of a graphical user interface, in accordance with example embodiments.
Figure 6B:
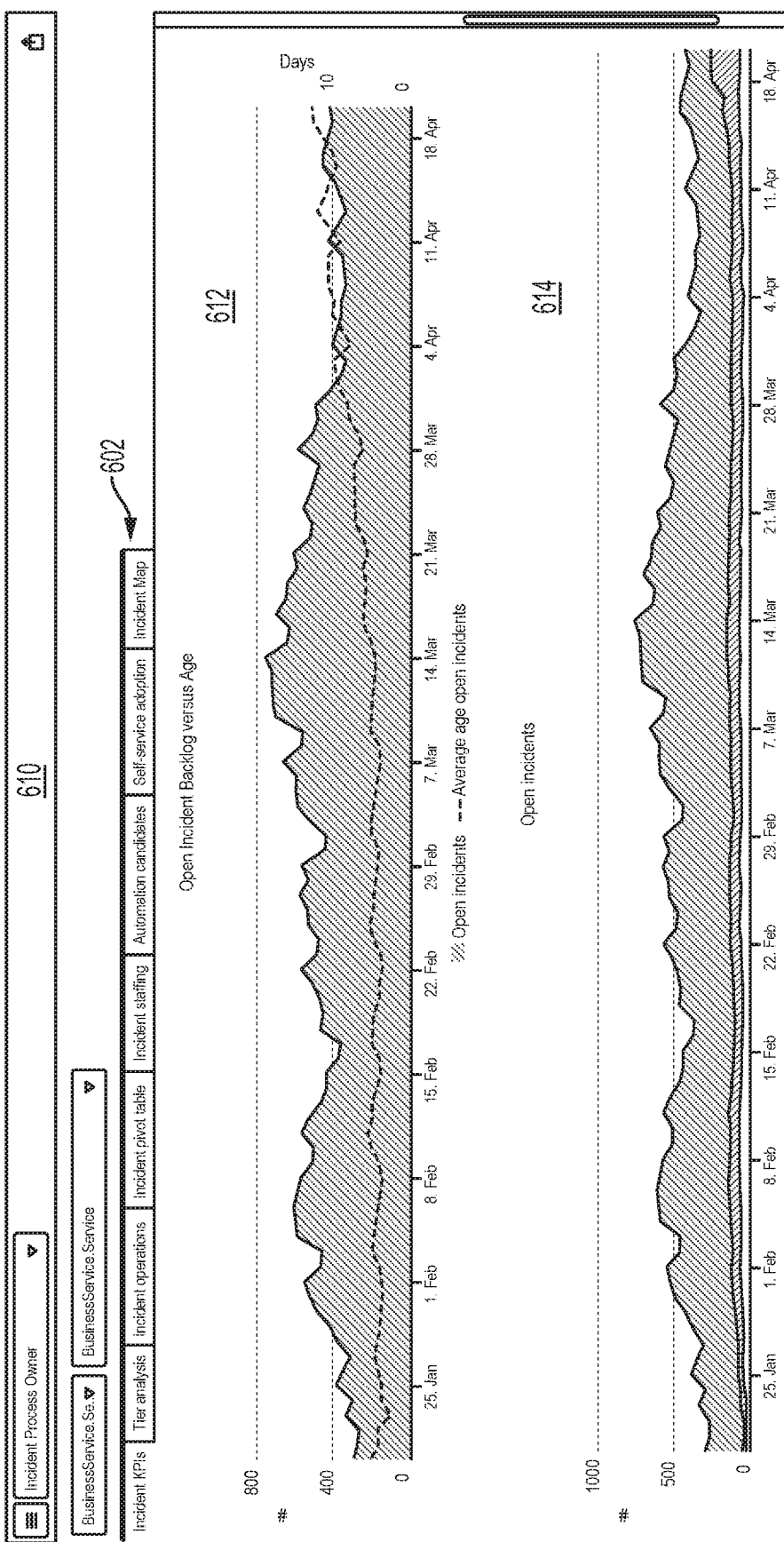
FIG. 6B depicts a performance analytics dashboard in the form of a graphical user interface, in accordance with example embodiments.

Example dashboards are shown in FIGS. 6A and 6B. Dashboard 600 of FIG. 6A includes multiple tabs 602, such as an "Incident KPIs" tab, a "Tier analysis" tab, and so on. The "Incident KPIs" tab is displayed, and includes a widget in the form of a bar chart 604, titled "Open incidents by age". Bar chart 604 plots, for each day of an approximately three-month time period, the total number of open incidents for the age ranges of 0-1 days, 1-5 days, 6-30 days, 31-90 days, and over 90 days. These age ranges may be defined by the "Age" category of breakdown 606.

These incidents may be, for example, trouble tickets or help requests opened with an IT organization. Each incident may therefore involve a particular problem that a user has experienced, such as a computer crashing, a user being unable to log on to a service, slow performance of a service, a request for new equipment, and so on. The IT organization may track its performance by measuring how long it takes to resolve the incidents. For example, bar chart 604 suggests that there were fewer open incidents near the end of the time frame than at the middle of the time frame, but that the incidents near the end of the time frame had remained open for a longer duration (i.e., there were more open incidents in the 31-90 days age range).

Dashboard 600 may also include section 608, which includes three widgets for: the extent of the open incident backlog (in this case, there are 422 open incidents currently), the first call resolution rate (in this case, 83.6%), and a seven-day running average of the mean time for an incident to be resolved (in this case, 3.08 days). This latter KPI may also be referred to mean time to resolution, or MTTR.

Dashboard 610 of FIG. 6B shows different example visualizations related to open incidents. This dashboard contains the same tabs 602, but includes charts 612 and 614 instead of bar chart 604 and section 608. Chart 612 plots, for the same time frame of the visualization in FIG. 6A, open incidents against the average age of these open incidents on a dual y-axis graph. Chart 614 also plots open incidents, but includes representations of the age distribution of these incidents.

Dashboards 600 and 610 also include various selectors, such as breakdowns in the form of drop down menus that allow the user to view these KPIs in different ways. Regardless of their exact mechanisms, these dashboards allow the user to rapidly determine the status of the organization's incident response KPIs through the use of visualizations that combine these KPIs.

The data displayed in bar chart 604, section 608, chart 610, and chart 612 may be visualizations defined by a data model. Thus, information defining these visualizations may be stored in a database according to that data model. The information may also be identified as representing one or more KPIs, and each KPI may be represented as one or more tables in the data model. As demonstrated in FIGS. 6A and 6B, multiple visualizations may use the same KPIs to provide different views of the represented data.

VI. Example Guided User Interface for Creation And Management of Indicators

In general, the potential number of KPIs for an enterprise or other organization can be quite large, numbering in the 100s to tens of 1,000s or more. In practice, KPIs can be highly interrelated and connected, such that data feeding a metric for one KPI may be the output data from another KPI or multiple other KPIs. For example, a KPI metric relating to number of overdue budget reports may directly affect a KPI measuring percent of expenses spent on late fees which in turn may directly affect a KPI measuring yearly operating expenses. Consequently, relationships between KPIs and between PA entities can be complicated.

In accordance with example embodiments, performance analytics may be implemented within or as part of a computational instance 322 as a system including a PA application program (and other possible software components) configured to operate on a computing device, such as a server, and one or more databases (and other possible hardware-based components). Elements of a PA system may also be configured to operate on one or more client devices in communication with network-based components, such as the PA application on a server and/or one or more databases. In further accordance with example embodiments, the PA application may provide a capability for an end user, such as an administrator or appropriately-authorized user, to create and maintain new indicators. In this arrangement, the PA application program may implement the various functions and operations of performance analytics, while client devices may provide a graphical user interface (GUI) for web-based applications (or other client-side applications) to interact with the PA application program operational on server or other computing device of a remote network management platform.

As described above, indicators represent KPIs or other organizational metrics used to evaluate current and past conditions, as well as to forecast trends. The terms "indicator" and "KPI" will generally be used interchangeably for purposes of the discussion herein, though they need not be identically defined in all instances. Indicators may be displayed as a part of dashboards, widgets, scorecards, tabs, or other PA entities on a GUI within the PA application. By displaying indicators as part of a GUI component, the PA application may enable end users to use and work with indicators, but without having to navigate the technical complexities that support the indicators.

In accordance with example embodiments, a single indicator may contain or be associated with a number of indicator attributes, such as several data collection jobs, a variety of filter conditions, and multiple breakdowns. These indicator attributes may then be linked together to provide the indicator with correct KPI data. In practice, a large enterprise may organize indicator attributes across several interfaces in the PA application, including multiple different database tables and/or other database structures. Consequently, the process of creating a new indicator may entail gathering and integrating indicator attributes, which may be large in number and/or varied in type. As such, absent a facility for identifying and organizing indicator attributes, creating a new indicator may be difficult and complicated for an end user, at least in some cases.

For instance, an enterprise may have thousands of potential indicator sources spread across hundreds of database tables. Thus, creating a new indicator may require a user to become aware of hundreds of database tables, associate or apply multiple filter conditions on those tables, and design separate collection jobs for those tables. Next, a user may be required to configure various breakdowns and then connect the new indicator to PA widgets. Additionally, a user may need to routinely monitor the new indicator for performance and potential errors.

Example embodiments herein provide systems and methods for efficient and streamlined creation and/or maintenance of KPIs by obtaining and intelligently identifying pertinent and/or relevant indicator attributes, and presenting them in an intelligently organized manner within a guided graphical user interface. More particularly, example embodiments herein coordinate processes and procedures of a PA application program operational on a server or the like with a unified graphical user interface operational on one or more client devices. The unified GUI serves to consolidate configuration of KPI within a single interactive framework. After indicator attributes are identified, the system may present the attributes in a concise, logical arrangement in a single graphical user interface, thus helping to organize and guide user actions in the process. For example, the representation may use a tabbed interface that enables a user to quickly navigate between various configuration options and attribute settings. Each tab may convey information regarding a different attribute or attributes associated with the indicator. In this way, the user may quickly review and switch between information on a single page.

The example layout and compilation of information in the example GUI representations presented herein illustrate efficient interactive displays and/or graphics for review of pertinent attributes of indicators within an enterprise or organization that tracks large numbers of KPIs. In particular, the example representations described herein organize and arrange indicator attributes into a single graphical user interface using graphics with intuitive visuals. As such, example GUI representations are designed to display the most relevant attributes for a selected indicator by default and organize the display of attributes by attribute type. In addition, the different graphics included within an example representation may be rearranged as expanded or contracted to reveal or hide details related to attribute values. This may facilitate interactive selection of a particular graphic for viewing additional details or attributes for the particular indicator. Further, the tabbed interface may support navigation among multiple representations, enabling a user to switch between, and view, different information about an indicator.

Figure 7:
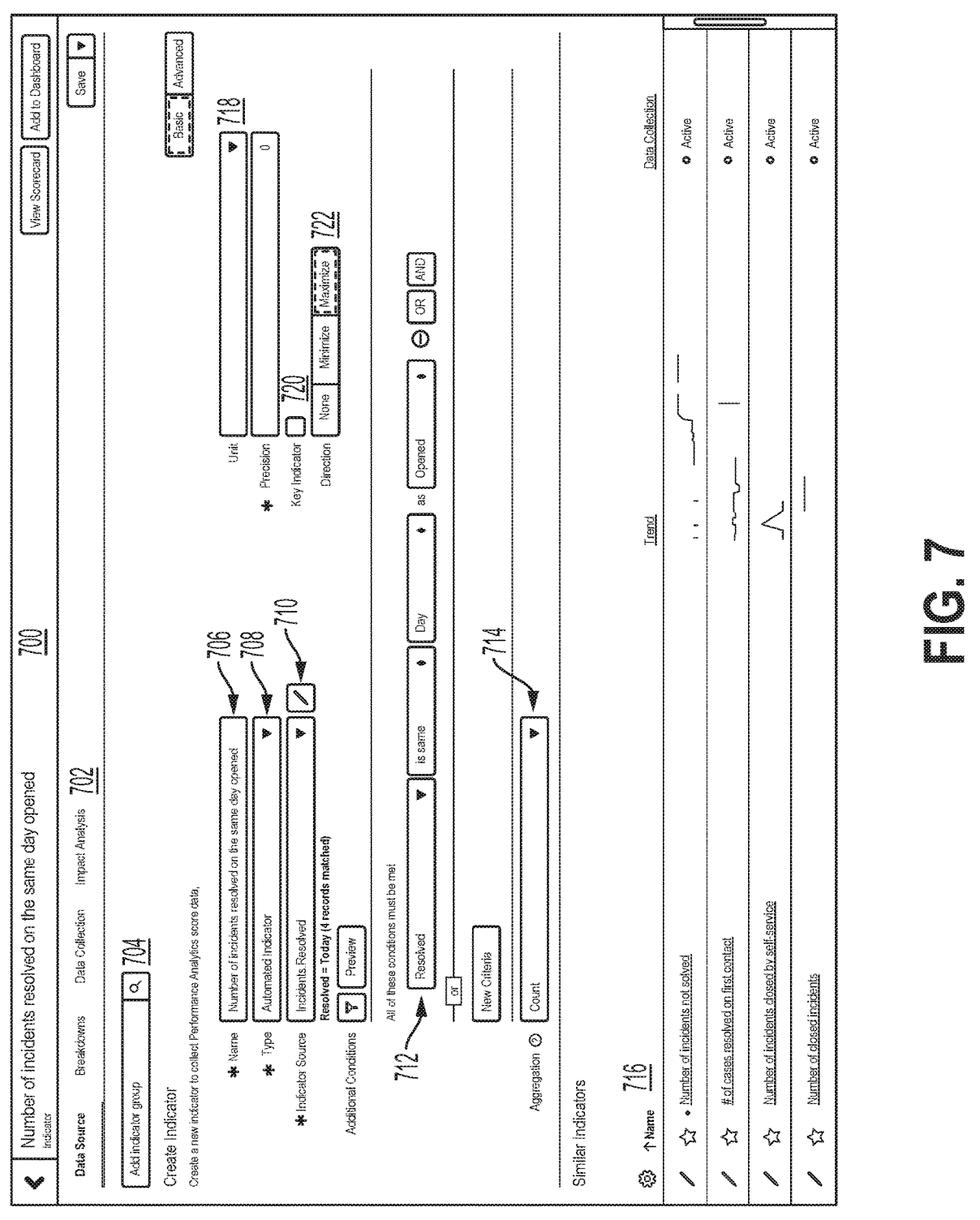

FIG. 7 depicts a graphical user interface for intelligently displaying information related to an indicator, in accordance with example embodiments. Graphical user interface 700 may be used to represent information related to an indicator in an intelligent arrangement that enables quick and efficient review. A system configured to generate graphical user interface 700 may identify information associated with a particular indicator selected by a user, and arrange the information for display in a GUI of a client device, for example.

As shown in FIG. 7, an example graphical user interface 700 includes tabbed interface 702, and a variety of other selectable fields and menu options, depending on which tab is active (e.g., selected). The tabbed interface 702 may allow the user to easily switch between pertinent indicator attributes and/or logically-grouped attributes on a single page view, without the need to navigate to a different webpage or window.

In the example, the tabbed interface 702 includes four options: "Data Source," "Breakdowns," "Data Collection," and "Impact Analysis." It will be appreciated that more or fewer tabs could be included in other embodiments. The four example tabs shown represent illustrative groupings of attributes that provide input controls for specifying how indicator data are collected, for specifying how collected data (e.g., scores) are filtered during analysis and evaluation, or for displaying dependencies among PA entities. For example attributes associated with Data Source generally identify and/or define what data should be collected for the indicator being created (or modified), and what filters should be applied during data collection. Attributes associated with Data Collection generally specify parameters relating to how often and for how long data associated with the indicator should be collected. Breakdowns generally specify data filtering applied to collected data (e.g., scores), and Impact Analysis provides a graphical representation of functional dependencies between various components of the PA program to help users navigate modifications they may wish to make. Each of the four example tabs is described in more detail below, including the types of selections and menu options that appear under each tab.

The illustration in FIG. 7 shows the GUI 700 for the Data Source tab, which may be selected for creating a new indicator or modifying an existing indicator. As shown, the Data Source tab includes an indicator group field 704, indicator name field 706, indicator type selector 708, indicator source selector 710, filter selector 712, aggregation selector 714, similar indicators interface 716, unit and precision selectors 718, key indicator toggle 720, and direction selector 722. The design of graphical user interface 700 is such that pertinent information is displayed in an easy to understand format. Additional graphics on graphical user interface 700 may be selected by user input to reveal further information about the indicator, including details that might not be initially shown in the default format of graphical user interface 700. It will be appreciated that the GUI 700 is shown by way of example, and could include more or fewer graphical component in one or more alternative arrangements. Various components of the GUI 700 may take the form drop-down menus of selectable options.

Indicator group field 704 and indicator name field 706 may represent text input fields. Indicator group field 704 may allow user input to assign one or more indicator groups to an indicator. Indicator groups may cluster indicators into related areas, such as Incidents or Business Performance. In practice, indicator groups may represent broad organizational goals or business units. Indicator groups allow users to filter or quickly search for indicators related to a specific enterprise area. In some embodiments, a system may use natural language processing to understand the text input queries provided via indicator group field 704 and display the most relevant indicator groups to the user. In other embodiments, indicator groups may be used as a security measure by enabling only authorized users to browse the indicators in a particular indicator group. Indicator group field 704 may also provide the capability to remove outdated or accidentally added groups from an indicator. Indicator name field 706 may allow users to create or modify the name of the indicator.

Indicator type selector 708 and indicator source selector 710 may represent selectable elements. For example, indicator type selector 708 may enable user input to specify whether an indicator is an automatic, manual, or formula indicator. Manual indicators may be used in situations where data cannot be retrieved (e.g., when there is no valid indicator source) and data must be entered manually. Formula indicators may be used to gather historic data of other indicators and apply analytical formulas directly inputted by a user. For example, a user may directly input ratio calculations or scalar multiplications of data from other indicator sources. Automatic indicators may be used to gather indicator scores from an indicator source at regular frequencies. Indicator source selector 710 may enable the user to select filtered sets of records from a facts table to evaluate when collecting indicator scores. Indicator source selector 710 may display a list of all facts tables and fields in those facts tables on the PA application. In some embodiments, indicator source selector 710 may include a search bar to allow the user to search for a particular field or facts table by name. In the example, the name is entered as "number of incidents resolved on the same day opened."

Filter selector 712 may serve to facilitate additional conditions for data collection. For example, filter selector 712, which may take the form of a drop-down menu, may be configured to only gather data from incidents that are resolved the same day as opened. Various drop-downs menus options may be provided by filter selector 712 to facilitate additional criteria for data collections. Criteria may be added conjunctively or disjunctively.

Aggregation selector 714 may represent a selectable option of aggregate functions to apply when calculating the indicator on the indicator source. Example aggregate functions may include count, for counting the number of records, and count distinct, for counting the number of unique values rather than the total number of records. For instance, if the name of a user submitting an incident report appears more than once, count distinct may only count the name once. Other types of aggregate operations may also be configured in the GUI 700.

Similar indicators interface 716 may include information on other indicators in the PA application that share common characteristics to the indicator being created or edited. For example, a user could potentially be creating an indicator that largely duplicates the function or purpose of an existing indicator. In this scenario, similar indicator interface 716 may identify that the indicator attributes are similar and suggest to the user to select and modify the existing indicator instead of creating a new one.

Unit and precision selectors 718 may provide the user the ability to set indicator score properties. The unit selector sets the unit of measurement for the indicator score, such as number, days, or percentages. The precision selector sets the number of digits behind the decimal. For example, a score of 612.875 with a precision of 0 may be displayed as 613. Key indicator toggle 720 may be used to specify if the indicator is a key metric for the process being monitored. In some embodiments, key metrics may be displayed in separate dashboards or scorecards. Direction selector 722 may be used to configure how analytical tools or graphic displays interpret the indicator score. In the example embodiments, the maximize option may be selected if an increase in the indicator score is desired. For example, a user may consider selecting maximize for an indicator that shows revenue. Analytic tools and graphic elements, such as those in scorecards, may then reflect that an increase in this indicator score is good and a decrease is bad. Conversely, a user may select minimize if a decrease is the indicator score is desired, such as cost. The "none" option may be selected if a change to the indicator score does not matter.

Note that graphical user interface 700 may have additional features not depicted. Attribute that relate to the configuration of an indicator may be displayed on graphical user interface 700 to assist users with quickly creating or maintaining indicators.

Figure 8A:
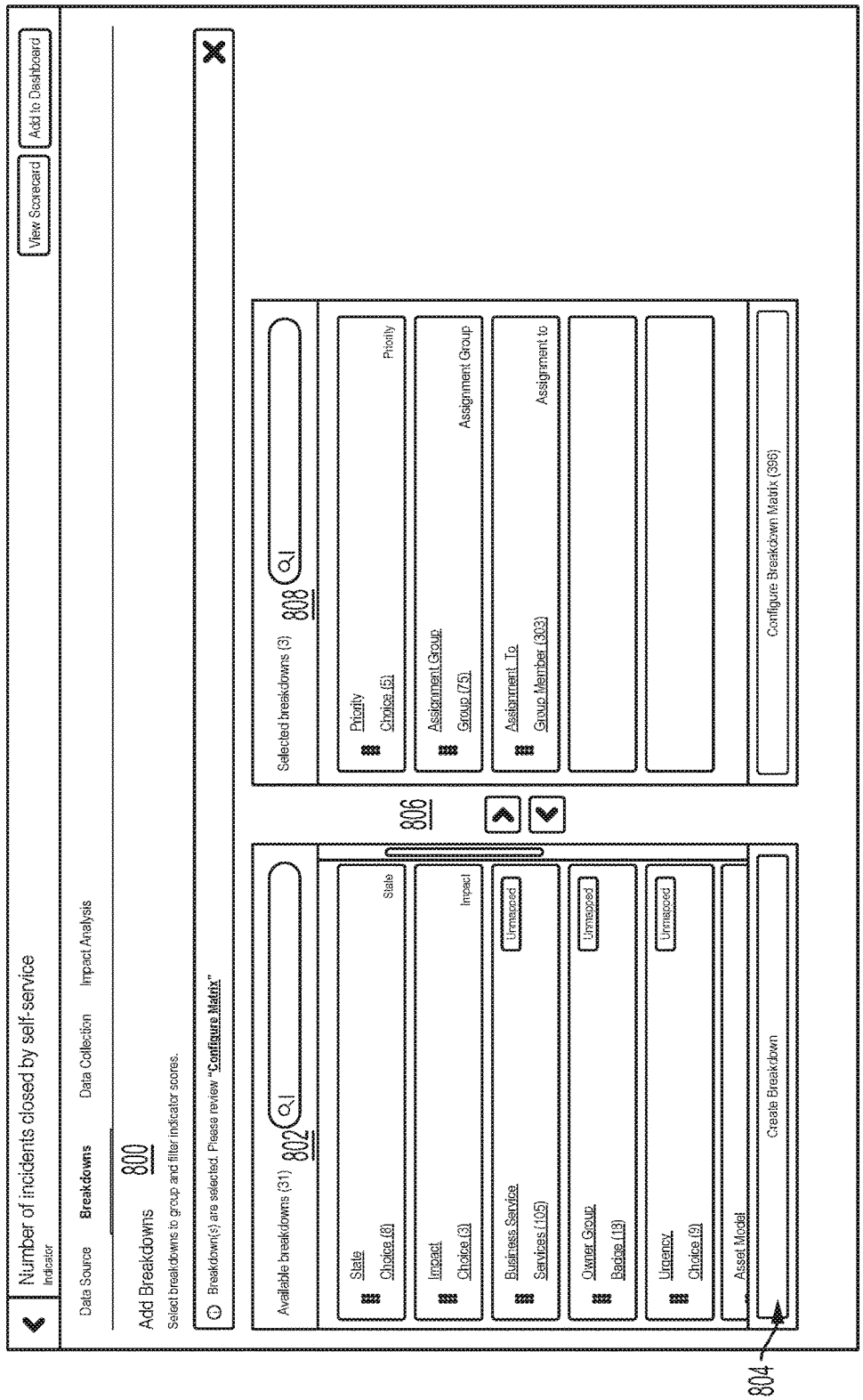
FIG. 8A depicts another example tab view of unified graphical user interface, in accordance with example embodiments.
Figure 8B:
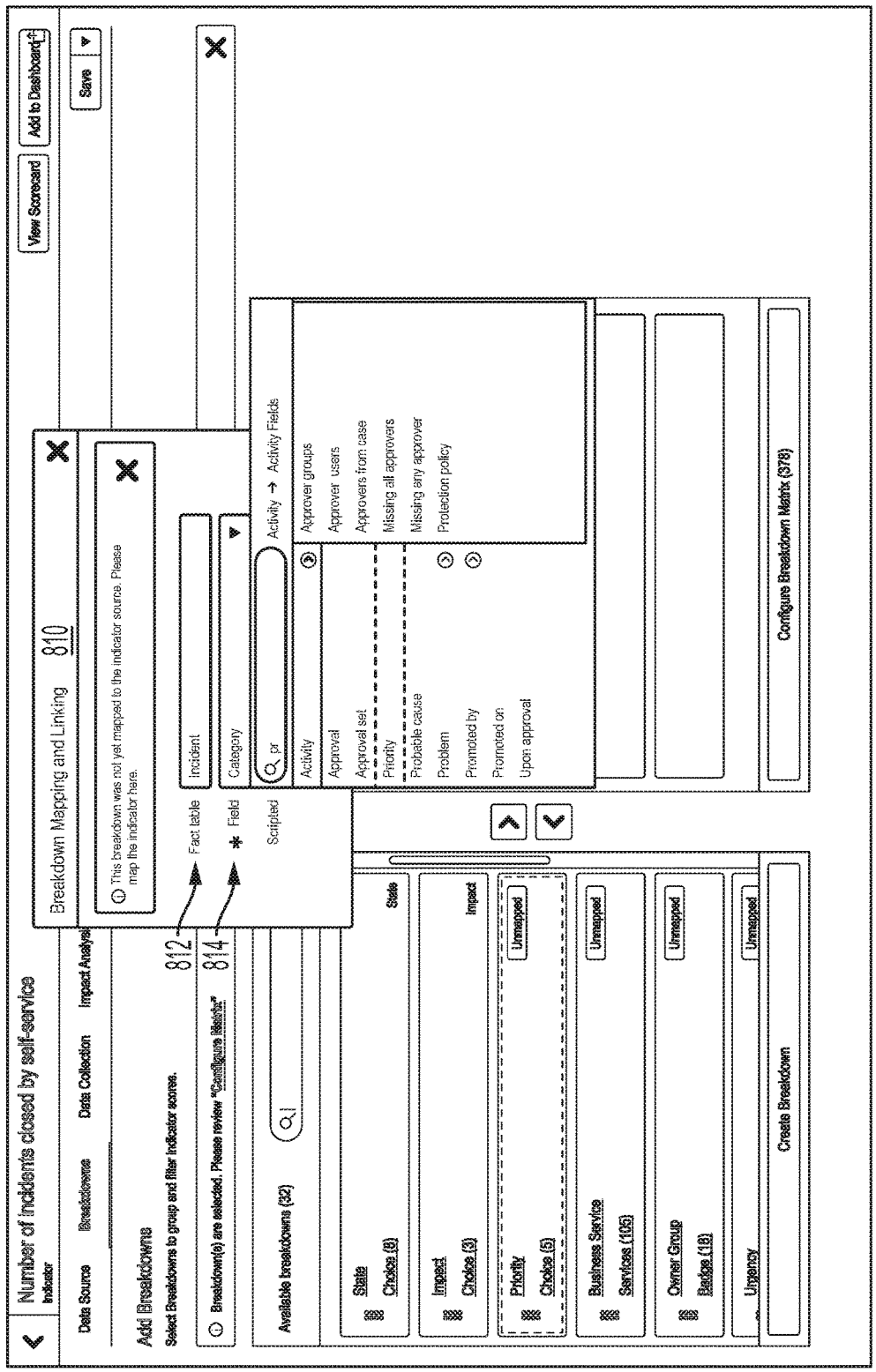
FIG. 8B depicts an example option on an example tab view of unified graphical user interface, in accordance with example embodiments.
Figure 8C:
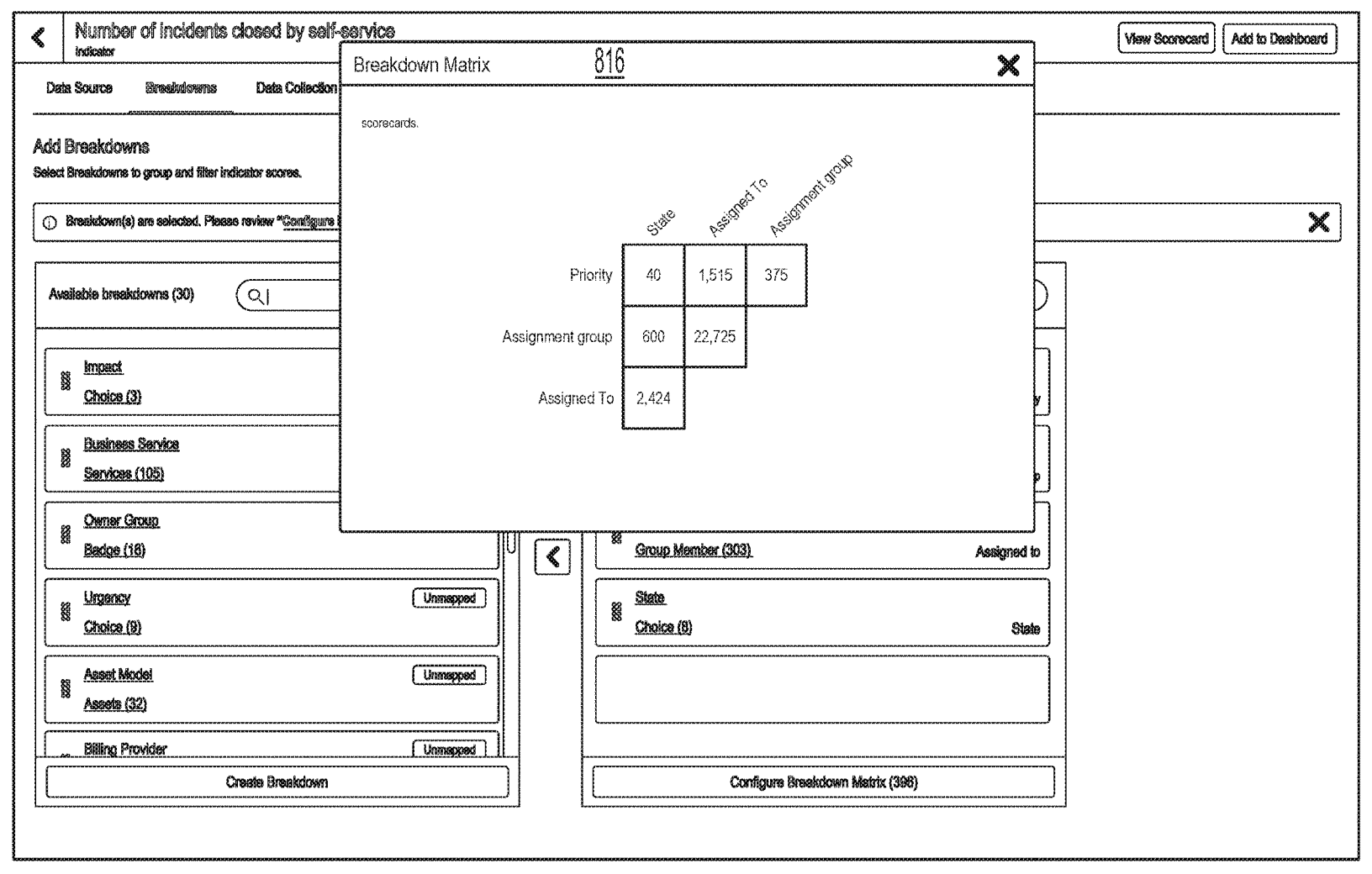

FIGS. 8A to 8C depict examples of the breakdown view 800 of tabbed interface 702. As described above, breakdowns provide for organization and filtering of collected indicator data on tabs and dashboards. That is, breakdowns are applied after data for KPIs are collected, as opposed to KPI filters that are applied to the collection process itself.

For example, using a breakdown, KPI data collected for IT trouble ticket incidents can be divided by priority or by originating department. The data source for the KPI may have been filtered during data collection so that the KPI data includes both priority and originating department (as well as possibly other categories). A breakdown may be defined by a breakdown name (i.e. "priority" or "state"), which gives a broad description the analysis type of the breakdown. In addition, each breakdown may contain two or more breakdown elements. Breakdown elements define the categories that breakdown filters may be applied to indicator scores. For example, breakdown elements for the breakdown "state" may include assigned, awaiting approval, approved, complete, closed, in progress, which represent the various process statuses of an incident report. Thus, a user may use these breakdown elements to search for incidents corresponding to a certain status.

In accordance with example embodiments, a breakdown itself defines a set of filters and attributes that are applied to collected indicator data, such as scores. The filters and attributes may be derived from one or more "breakdown sources." Thus, a breakdown source may correspond to information that specifies one or more filters or attributes of a breakdown.

In further accordance with example embodiments, a given breakdown may be used for more than one indictor. The association of an indicator with a breakdown may be made by mapping one or more fields to a breakdown source. While the number and complexity of such mappings can be large, the GUI for breakdowns provides options in convenient drop-down menus, thereby largely insulating end users from the complexities.

In an example embodiment, breakdowns may be automated, manual, or external according to the type of breakdown sources used. Automated breakdowns may have breakdown elements that can be determined from breakdown sources that specify which unique elements a breakdown contains, by defining a set of records from a table or database. In the example embodiments, a user may define a breakdown source by selecting a database, selecting a field within the database, and defining filter conditions. Thus, the source for automated breakdowns may be derived from existing databases and/or tables, where descriptions of data fields may serve as filter elements. For example, a user may create a breakdown source by selecting a table named HR, choosing the field HR ID, and then defining a filter condition to only select entries that start with letters "HR." Thus, example breakdown elements from this breakdown source may include HR Finance, HR America, HR General, and HR Europe. Note that multiple breakdowns can use the same breakdown source.

Alternatively, manual breakdowns may have breakdown elements that are entered manually by a user to define an organization. An external breakdown may specify an external data source outside of the PA application, such as a Java Database Connectivity (JDBC) data source, and uses Structured Query Language (SQL) statements for retrieving breakdown elements.

By way of example, FIG. 8A depicts breakdown interface 800 with available breakdown list 802. Available breakdown list 802 contains available breakdowns to apply to an indicator. If a breakdown is not found in available breakdown list 802, it may be generated as a new breakdown with the create breakdown button 804. The new breakdown may then be automatically added to the available breakdown list 802. To add a breakdown to an indicator, a user may move a breakdown from available breakdown list 802 to selected breakdown list 808 via buttons 806. Alternatively, breakdown interface 800 may be configured to allow users to drag and drop breakdowns from available breakdown list 802 to selected breakdown list 808.

In the example embodiments, available breakdown list 802 contains both user defined breakdowns and default breakdowns. Example default breakdowns might include category (which may include breakdown elements such as benefits, payroll, employee relations, or HR policies) and priority (which may include breakdown elements such as low, medium, high). Default breakdowns may be applied to a new indicator without any additional configuration. User defined breakdowns may instead require additional configuration. In the present embodiments, this additional configuration may be referred to as breakdown mapping.

FIG. 8B depicts a breakdown mapping interface 804. Breakdown mapping interface 810 assigns an available breakdown to a field in the indicator source table. This mapping allows the breakdown to filter the indicator scores based on the value in the selected field. Using the previously example, a breakdown mapping may be created by selecting the indicator source table 812 and then selecting a field 814 within the table. Using the previous example, a user may select the incidents facts table and then select the "priority" field of the incidents facts table as the breakdown mapping. Accordingly, if a user filters the "number of incidents resolved on the same day opened" indicators scores with a "priority" breakdown, all incidents scores that share the same value for the priority field will be grouped into the same breakdown element.

FIG. 8C shows an example breakdown matrix 816. In example embodiments, a breakdown matrix may be used to summarize information on two-breakdown combinations for an indicator. This may allow a user to exclude unnecessary or meaningless combinations of breakdowns from being collected. For example, an indicator may have two breakdown layers: problems by country and by assignment region. In the PA application, an option may be enabled by default for new indicators to collect all scores for the multiple breakdowns. However, this option multiplies the amount of data a PA application collects. Often, not all breakdown combinations give useful information. For example, the combination [Country, Region] may provide the same scores as the breakdown Country. A user may prevent collecting data for these invalid combinations with breakdown matrix exclusions, but these exclusions may not be shown in scorecards or when creating widgets. Thus, breakdown matrix 816 allows users to select combinations to exclude from data collection. In the example embodiments, included combinations are shaded in the breakdown matrix and excluded combinations are white.

FIG. 9 depicts a data collection view of tabbed interface 702. Data collection allows data collection jobs to be set up, including parameters that control the jobs. As shown by way of example, the data collection tab includes job interface 900. In the example embodiments, job interface 900 may allow the user to create or edit the data collection jobs to automatically send data from PA databases to the indicator. Jobs may be scheduled to measure an indicator every day, week, month, quarter or year. In the example embodiments job interface 900 contains a listing of all jobs associated with the indicator, whether the job is currently active, and the specific breakdowns the job collects data for. New jobs may be added to job interface via new job button 902. Additionally, the data collection view of tabbed interface 702 may include an immediate collection interface 904 which allows the user to run a single job to immediately collect indicator scores.

Figure 10:
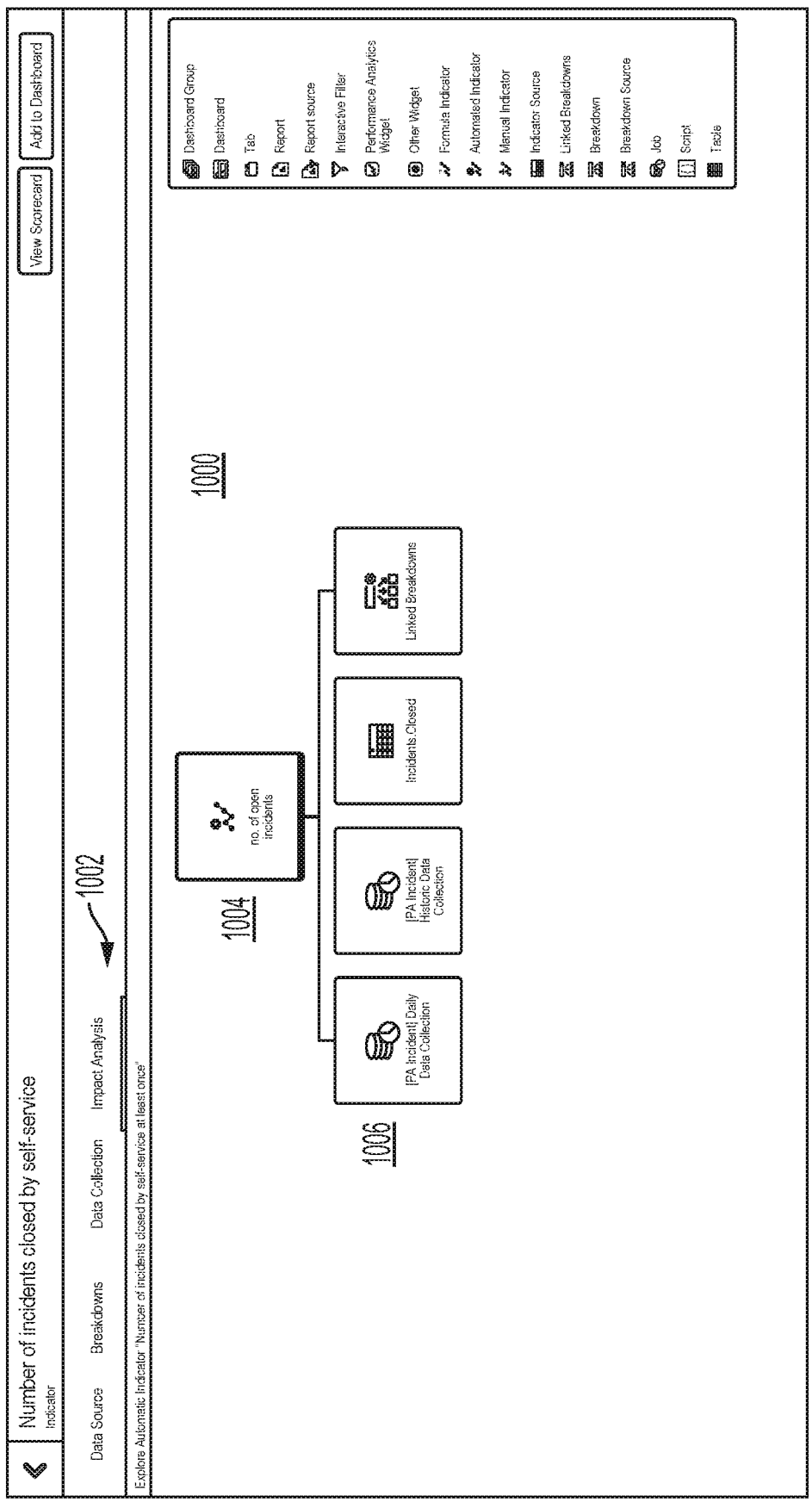
FIG. 10 depicts yet another example tab view of unified graphical user interface, in accordance with example embodiments.

FIG. 10 depicts the impact analysis view of tabbed interface 702. With impact analysis, a user may use a dependency tree 1000 to visually identify all breakdowns, indicators sources, jobs, or other PA entity dependencies that may be associated with the new or existing indicator. For example, dependency tree 1000 may contain a node 1002 to represent the indicator being created by the user. Branching from node 1002, dependency nodes 1004 are be shown. Dependency nodes 1004 may represents other PA entities, such as indicator sources, linked breakdowns, and jobs. The hierarchical relationship between node 1002 and dependency nodes 1004 visually illustrate to the user that the node 1002 relies on all dependency nodes 1004 during operation.

Impact analysis view may also contain a legend 1006 to associate a performance analytics type with a node on the dependency tree 1000. For example, legend 1006 may be displayed alongside dependency tree 1000. Each node in dependency tree 1000 may have an icon that is associated with a piece of text on legend 1006 to enable a user to easily identify performance analytics types. Performance analytics types may include tabs, formula indicators, breakdowns, dashboards or other general PA entities that exist in a PA application. In some embodiments, a user may hover over or click a node in dependency tree 1000 and the node's performance analytics type may be highlighted in legend 1006. The dependency tree may help users visualize how changes to a given PA entity may impact other PA entities, for example.

Figure 11:
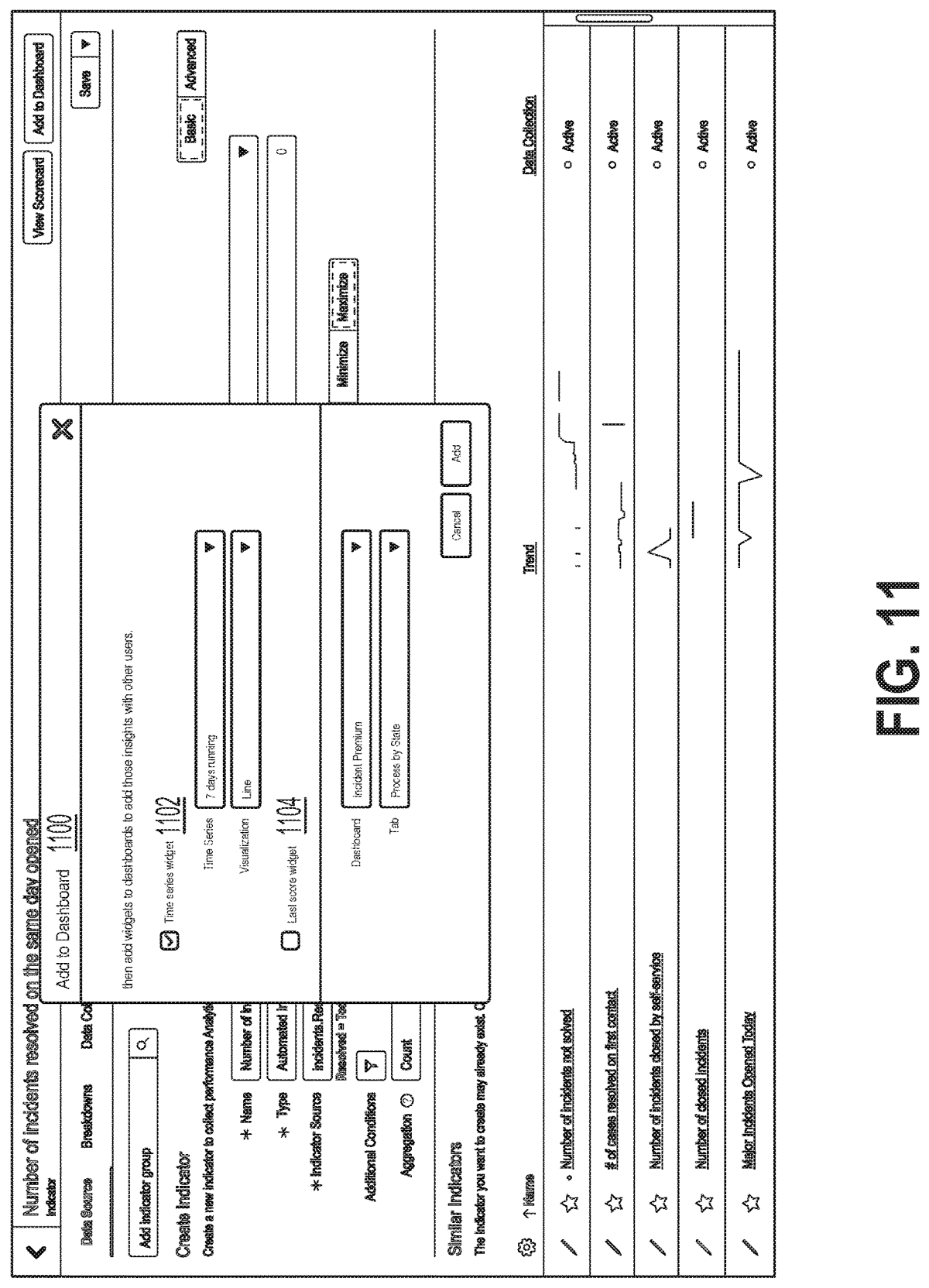

FIG. 11 depicts an example operation of adding an indicator to a dashboard. In the example embodiments, indicator score cards may be added as widgets to dashboards on the PA application via dashboard adding interface 1100. Dashboards enables users to easily visualize multiple indicator scores to compare enterprise metrics. In the example embodiments, a user may create a time series widget with time series selector 1102 to display changes to the indicator score over time. The time series may be configured to display the average yearly scores, weekly sums, or daily totals. Alternatively, a user may create a last score widget with last score selector 1104 to display the changes between the latest score and a pervious score. A latest score widget may show the latest score and both the absolute and percentage change between this score and a previous score. Once the widget type is defined, a user may add the widget to specific tab on a specific dashboard to be displayed.

The above examples illustrate only a few possible usage scenarios of a guided user interface for creation and management of indicators. It will be appreciated that other example embodiments are possible as well.

VII. Example Operations

Figure 12:
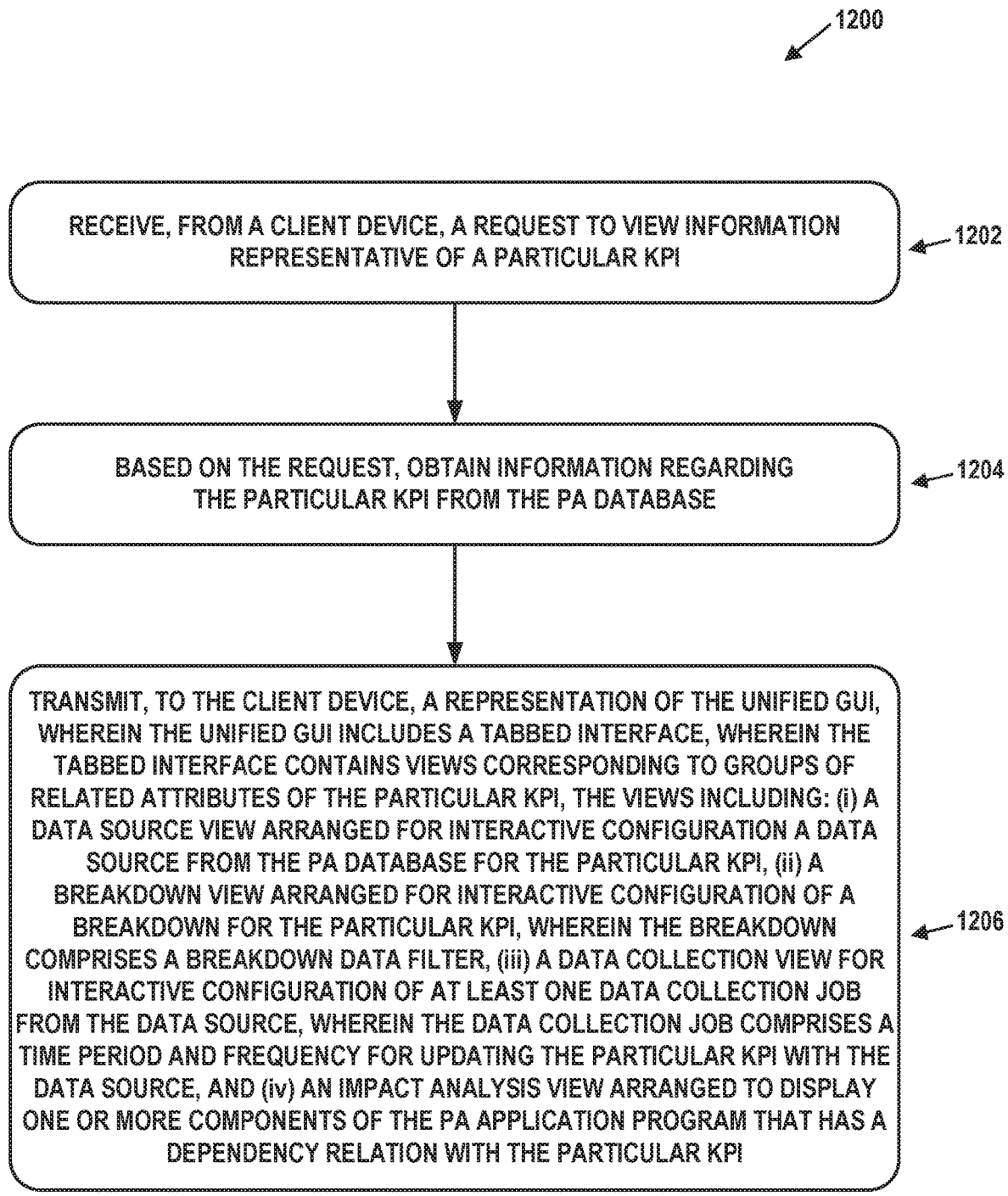
FIG. 12 is a flow chart, in accordance with example embodiments.

FIG. 12 is a flow chart illustrating an example embodiment of a method 1200 for configuring a performance analytics (PA) software application, in particular by using a guided graphical user interface. The method illustrated by FIG. 12 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device. In an example embodiment, the method illustrated in FIG. 12 may be carried out by a computing device disposed within a computational instance, such as instance 322, of a remote network management platform, such as platform 320, which remotely manages a managed network, such as network 300.

In example embodiments, the example method 1200 may be implemented by a configuration program executing or executable on a computing device. As described, the example method 1200 may include actions and operations carried out by a computing device, some of which involve providing information to a client device or receiving information from the client device. As such, some of these actions and operations may have corresponding actions and operations carried out by the client device. For example, the client device may display certain graphical representations in a graphical user interface (GUI), based on information transmitted or supplied by the computing device. Similarly, some information received by the computing device from the client device may originate from user input at the GUI of the client device. Some these corresponding actions and operations of the client device may thus be considered part of one or more methods corresponding to the example method 1200, and carried out in the client device.

The embodiments of FIG. 12 may be simplified by the removal of any one or more of the features shown therein. Further, these embodiments may be combined with features, aspects, and/or implementations of any of the previous figures or otherwise described herein.

In accordance with example embodiments, the computing device that is configured to carry out the example method 1200 may be part of a PA system that also includes a database containing data for generating a unified graphical user interface (GUI) for consolidating configuration of key performance indicators (KPIs) of the managed network. The PA software application may also be considered part of the PA system, which may also include components or PA entities for processing one or more KPIs of the managed network. Non-limiting examples of a PA entity include a KPI, a dashboard, a dashboard tab, a scorecard, a widget, a breakdown, or a database. In general, there may be multiple functional dependencies among PA entities.

Block 1102 may involve receiving from a client device a request to view information representative of a particular KPI. The request may be for information relating to an existing KPI, or for creation of new KPI. In accordance with example embodiments, the request may originate as a result or as part of interactive input to a client device that then transmits the request to the computing device on which the method is executing.

Block 1104 may involve obtaining information regarding the particular KPI from the PA database, based on the request. The PA database may include information relating to existing KPIs, as well as provide for creating entries for new KPIs. The information regarding the particular KPI may therefore include information for an existing KPI or a new KPI created in response to a request to do so. The information may also include data identifying database tables, structures, records, and the like, which may be used in constructing the unified GUI.

Finally, block 1106 may involve transmitting to the client device a representation of the unified GUI. In accordance with example embodiments, the unified GUI may include a tabbed interface, where the tabbed interface contains views corresponding to groups of related attributes of the particular KPI. The unified GUI may be configured for interactive navigation between tabs on a single graphical user interface page. In an example embodiment, the views may include: (i) a data source view arranged for interactive configuration a data source from the PA database for the particular KPI, (ii) a breakdown view arranged for interactive configuration of a breakdown for the particular KPI, wherein the breakdown comprises a breakdown data filter, (iii) a data collection view for interactive configuration of at least one data collection job from the data source, wherein the data collection job comprises a time period and frequency for updating the particular KPI with the data source, and (iv) an impact analysis view arranged to display one or more components of the PA application program that has a dependency relation with the particular KPI.

In accordance with example embodiments, there may be one or more corresponding actions carried out by the client device to generate and display the unified GUI from the representation transmitted by the computing device and received by the client device.

In accordance with example embodiments, the data source view may include an interactive interface for creating new KPIs. As such, the representation, when rendered by a client device may include the interactive interface, and interactive configuration of the data source for the KPI may therefore include receiving interactive input for creation the particular KPI. The interactive input may first be received at the client device, and then received by the computing device via transmission from the client device.

In accordance with example embodiments, the data source view may include interactive interfaces for: (i) selection of a data source for the particular KPI, and (ii) configuration of one or more filter conditions to apply to the data source during data collection. Again, a client device may render these interactive interfaces and receive interactive input for both selection of a data source for the particular KPI and for configuring at least one of the one or more filter conditions to apply to the data source during data collection. In an example embodiment, the interactive interface for configuration of the one or more filter conditions may be arranged to configure an initial data filter. The computing device may then receive the input by way of the client device.

In further accordance with example embodiments, the data source view may further include an interactive interface for displaying a list of similar indicators. For example, indicators in the list may be deemed "similar" if they are KPIs having the same name as the particular KPI, if they have the same data source as the particular KPI, or both. There can be other criteria for specifying similarity.

In accordance with example embodiments, the breakdown data filter of the breakdown may be a secondary data filter that is applied to indicator data obtained for the particular KPI from the data source by data collection carried out according to one or more data collection filter definitions of the particular KPI. This follows from the discussion above describing breakdowns as filters or criteria applied to after data collection.

In further accordance with example embodiments, applying the breakdown for the particular KPI may entail selecting a particular field in the data source of the particular KPI, and grouping data with identical entries in the particular field into a same indicator element. This may help avoid a type duplication in which the breakdown criteria might otherwise select the same data more than one. For example, if a breakdown would otherwise multiply select data belonging to a particular category and a sub-category of the particular category.

In accordance with example embodiments, the breakdown may further include a breakdown source that defines one or more breakdown elements for the breakdown, where the breakdown elements correspond to filter components of the breakdown filter. Further, the breakdown source may be of (i) an automated source including a particular field of a particular table in the PA database, (ii) a manual source defined according to manually entered text-based input, or (iii) an external source defined according to an programmatic script. In addition, the breakdown view may include an interactive interface for receiving input for selection of the breakdown source. Once more, a client device may render the interactive interface and receive interactive input that specifies the breakdown source. The computing device may then receive the input by way of the client.

In accordance with example embodiments, interactive configuration of at least one data collection job may correspond to association of a plurality of data collection jobs with the particular indicator.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system for configuring a performance analytics (PA) software application, wherein the system is disposed within a computational instance of a remote network management platform that is associated with a managed network, and the PA software application is configured for processing and analysis of performance data of the managed network, the system comprising:
a PA database containing data for generating a unified graphical user interface (GUI) for consolidating configuration of key performance indicators (KPIs) of the managed network;
one or more server devices disposed within the remote network management platform, wherein the one or more server devices are configured to:
receive, from a client device, a request to view information representative of a particular KPI;
based on the request, obtain information regarding the particular KPI from the PA database; and
transmit, to the client device, a representation of the unified GUI, wherein the unified GUI includes a plurality of tabs, wherein each tab of the plurality of tabs, when selected, displays a respective view of a plurality of views, wherein the plurality of views correspond to groups of related attributes of the particular KPI, and wherein the plurality of views comprise:
(i) a data source view configured to allow a user to configure a data source from the PA database for the particular KPI,
(ii) a breakdown view configured to allow the user to configure a breakdown for the particular KPI, wherein the breakdown comprises a breakdown data filter,
(iii) a data collection view configured to allow the user to configure at least one data collection job from the data source, wherein the data collection job comprises a time period and frequency for updating the particular KPI with the data source, and
(iv) an impact analysis view configured to display one or more components of the PA application program that has a dependency relation with the particular KPI.

2. The system of claim 1, wherein the unified GUI is configured for interactive navigation between the plurality of tabs on a single graphical user interface page.

3. The system of claim 1, wherein the data source view comprises an interactive interface for creating new KPIs,
and wherein interactive configuration of the data source for the particular KPI includes receiving interactive input for creation the particular KPI.

4. The system of claim 1, wherein the data source view comprises interactive interfaces for: (i) selection of the data source for the particular KPI, and (ii) configuration of one or more filter conditions to apply to the data source during data collection,
and wherein interactive configuration of the data source for the particular KPI includes receiving interactive input for selection of the data source for the particular KPI, and receiving interactive input for configuring at least one of the one or more filter conditions to apply to the data source during data collection.

5. The system of claim 4, wherein the interactive interface for configuration of the one or more filter conditions is arranged to configure an initial data filter.

6. The system of claim 1, wherein the data source view comprises an interactive interface for displaying a list of similar indicators, wherein the similar indicators are KPIs having at least one of: a same name as the particular KPI, or a same data source as the particular KPI.

7. The system of claim 1, wherein the breakdown data filter of the breakdown is a secondary data filter that is applied to indicator data obtained for the particular KPI from the data source by data collection carried out according to one or more data collection filter definitions of the particular KPI.

8. The system of claim 7, wherein applying the breakdown for the particular KPI comprises selecting a particular field in the data source of the particular KPI, wherein data with identical entries in the particular field are grouped into a same indicator element.

9. The system of claim 1, wherein the breakdown further comprises a breakdown source that defines one or more breakdown elements for the breakdown, the breakdown elements corresponding to filter components of the breakdown filter,
wherein the breakdown source is one of: (i) an automated source comprising a particular field of a particular table in the PA database, (ii) a manual source defined according to manually entered text-based input, or (iii) an external source defined according to an programmatic script,
wherein the breakdown view comprises an interactive interface for receiving input for selection of the breakdown source, and wherein interactive configuration of the breakdown comprises receiving interactive input that specifies the breakdown source.

10. The system of claim 1, wherein interactive configuration of at least one data collection job comprises association of a plurality of data collection jobs with the particular indicator.

11. A method for configuring a performance analytics (PA) software application configured for execution on a computing device disposed within a computational instance of a remote network management platform that is associated with a managed network, wherein the PA software application is configured for processing and analysis of performance data of the managed network, wherein the remote network management platform comprises a PA database containing data for generating a unified graphical user interface (GUI) for consolidating configuration of key performance indicators (KPIs) of the managed network, and wherein the method comprises:
  receiving, from a client device, a request to view information representative of a particular KPI;
  based on the request, obtaining information regarding the particular KPI from the PA database; and
  transmitting, to the client device, a representation of the unified GUI, wherein the unified GUI includes a plurality of tabs, wherein each tab of the plurality of tabs, when selected, displays a respective view of a plurality of views, wherein the plurality of views correspond to groups of related attributes of the particular KPI, and wherein the plurality of views comprise:
    (i) a data source view configured to allow a user to configure a data source from the PA database for the particular KPI,
    (ii) a breakdown view configured to allow the user to configure a breakdown for the particular KPI, wherein the breakdown comprises a breakdown data filter,
    (iii) a data collection view configured to allow the user to configure at least one data collection job from the data source, wherein the data collection job comprises a time period and frequency for updating the particular KPI with the data source, and
    (iv) an impact analysis view configured to display one or more components of the PA application program that has a dependency relation with the particular KPI.

12. The method of claim 11, wherein the data source view comprises an interactive interface for creating new KPIs,
  and wherein interactive configuration of the data source for the particular KPI includes receiving interactive input for creation the particular KPI.

13. The method of claim 11, wherein the data source view comprises interactive interfaces for: (i) selection of the data source for the particular KPI, and (ii) configuration of one or more filter conditions to apply to the data source during data collection,
  and wherein interactive configuration of the data source for the particular KPI includes receiving interactive input for selection of the data source for the particular KPI, and receiving interactive input for configuring at least one of the one or more filter conditions to apply to the data source during data collection.

14. The method of claim 13, wherein the interactive interface for configuration of the one or more filter conditions is arranged to configure an initial data filter.

15. The method of claim 11, wherein the data source view comprises an interactive interface for displaying a list of similar indicators, wherein the similar indicators are KPIs having at least one of: a same name as the particular KPI, or a same data source as the particular KPI.

16. The method of claim 11, wherein the breakdown data filter of the breakdown is a secondary data filter that is applied to indicator data obtained for the particular KPI from the data source by data collection carried out according to one or more data collection filter definitions of the particular KPI.

17. The method of claim 16, wherein applying the breakdown for the particular KPI comprises selecting a particular field in the data source of the particular KPI, wherein data with identical entries in the particular field are grouped into a same indicator element.

18. The method of claim 11, wherein the breakdown further comprises a breakdown source that defines one or more breakdown elements for the breakdown, the breakdown elements corresponding to filter components of the breakdown filter,
  wherein the breakdown source is one of: (i) an automated source comprising a particular field of a particular table in the PA database, (ii) a manual source defined according to manually entered text-based input, or (iii) an external source defined according to an programmatic script,
  wherein the breakdown view comprises an interactive interface for receiving input for selection of the breakdown source,
  and wherein interactive configuration of the breakdown comprises receiving interactive input that specifies the breakdown source.

19. The method of claim 11, wherein interactive configuration of at least one data collection job comprises association of a plurality of data collection jobs with the particular indicator.

20. A non-transitory computer readable medium having instructions stored thereon for configuring a performance analytics (PA) software application, wherein the PA software application is configured for execution on a computing device disposed within a computational instance of a remote network management platform that is associated with a managed network, and the PA software application is configured for processing and analysis of performance data of the managed network, wherein the remote network management platform comprises a PA database containing data for generating a unified graphical user interface (GUI) for consolidating configuration of key performance indicators (KPIs) of the managed network, and wherein the instructions, when executed by one or more processors, cause the one or more processors to carry out operations including:
  receiving, from a client device, a request to view information representative of a particular KPI;
  based on the request, obtaining information regarding the particular KPI from the PA database; and
  transmitting, to the client device, a representation of the unified GUI, wherein the unified GUI includes a plurality of tabs, wherein each tab of the plurality of tabs, when selected, displays a respective view of a plurality of views, wherein the plurality of views correspond to groups of related attributes of the particular KPI, and wherein the plurality of views comprise:
    (i) a data source view configured to allow a user to configure a data source from the PA database for the particular KPI, (ii) a breakdown view configured to allow the user to configure a breakdown for the particular KPI, wherein the breakdown comprises a breakdown data filter,
(iii) a data collection view configured to allow the user to configure at least one data collection job from the data source, wherein the data collection job comprises a time period and frequency for updating the particular KPI with the data source, and
(iv) an impact analysis view configured to display one or more components of the PA application program that has a dependency relation with the particular KPI.

* * * * *